(12) United States Patent
Ojiro et al.

(10) Patent No.: US 9,126,403 B2
(45) Date of Patent: Sep. 8, 2015

(54) INKJET PRINTING APPARATUS

(71) Applicant: CANON KABUSHIKI KAISHA, Tokyo (JP)

(72) Inventors: Hinako Ojiro, Wynnewood, PA (US); Makoto Torigoe, Tokyo (JP); Hiroshi Tajika, Yokohama (JP); Yuji Konno, Kawasaki (JP); Takeshi Yazawa, Yokohama (JP); Hiroshi Taira, Fuchu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 13/886,312

(22) Filed: May 3, 2013

(65) Prior Publication Data

US 2013/0300790 A1    Nov. 14, 2013

(30) Foreign Application Priority Data

May 8, 2012  (JP) ................. 2012-106988

(51) Int. Cl.
*B41J 2/07* (2006.01)
*B41J 2/21* (2006.01)
*H04N 1/405* (2006.01)
*H04N 1/54* (2006.01)

(52) U.S. Cl.
CPC .............. *B41J 2/07* (2013.01); *B41J 2/2114* (2013.01); *H04N 1/4053* (2013.01); *H04N 1/54* (2013.01)

(58) Field of Classification Search
CPC ............. B41J 2/07; B41J 2/2114; B41J 29/38
See application file for complete search history.

(56) References Cited

U.S. PATENT DOCUMENTS

| | | | |
|---|---|---|---|
| 5,528,270 A | 6/1996 | Tajika et al. | |
| 5,825,377 A | 10/1998 | Gotoh et al. | |
| 5,946,006 A | 8/1999 | Tajika et al. | |
| 6,109,720 A | 8/2000 | Gotoh et al. | |
| 6,113,210 A | 9/2000 | Gotoh et al. | |
| 6,364,446 B1 | 4/2002 | Ishikawa et al. | |
| 6,412,934 B1 | 7/2002 | Moriyama et al. | |
| 6,834,947 B2 | 12/2004 | Moriyama et al. | |
| 7,057,756 B2 | 6/2006 | Ogasahara et al. | |

(Continued)

FOREIGN PATENT DOCUMENTS

JP    2011-218564 A    11/2011

OTHER PUBLICATIONS

Paul G. Roetling, "Visual Performance and Image Coding", Image Processing, SPIE/OSA, 1976, pp. 195-199, vol. 74.

*Primary Examiner* — Geoffrey Mruk
*Assistant Examiner* — Scott A Richmond
(74) *Attorney, Agent, or Firm* — Fitzpatrick, Cella, Harper & Scinto

(57) ABSTRACT

Provided is an inkjet printing apparatus that, when performing multi-pass printing using pigmented ink and image enhancing liquid for adjusting the glossiness, is capable of outputting a high-quality image in which gloss unevenness due to displacement of the printing position cannot be noticed. In order to accomplish this, dot arrangement data is generated based on input image data so that the dot arrangement of image enhancing liquid includes a greater low-frequency component in the spatial frequency than the dot arrangement of colored ink on a print medium. As a result, it is possible to suppress gloss unevenness even when printing position displacement occurs, while at the same time suitably suppressing a feeling of graininess in colored ink.

14 Claims, 21 Drawing Sheets

(56) References Cited

U.S. PATENT DOCUMENTS

| | | |
|---|---|---|
| 8,287,074 B2 | 10/2012 | Kano et al. |
| 2007/0188528 A1* | 8/2007 | Kakutani .......................... 347/5 |
| 2010/0245470 A1 | 9/2010 | Murayama et al. |
| 2011/0032296 A1 | 2/2011 | Nakano et al. |
| 2011/0242176 A1 | 10/2011 | Iritani et al. |
| 2012/0033006 A1 | 2/2012 | Murayama et al. |
| 2012/0050362 A1 | 3/2012 | Iritani et al. |
| 2012/0050365 A1* | 3/2012 | Konno et al. .................. 347/14 |

* cited by examiner

INKJET PRINTING APPARATUS

BACKGROUND OF THE INVENTION

1. Field of the Invention

The present invention relates to an inkjet printing apparatus that prints images on a print medium using colored ink and image enhancing liquid.

2. Description of the Related Art

In recent years, inkjet printing apparatuses that use pigmented ink capable of obtaining high image fastness properties have become popular. However, there are many kinds of pigmented ink for which penetration of color into the print medium is difficult, and there is a tendency for pigment to remain on the surface of the print medium. Therefore, particularly in dark areas where a large amount of ink is used, the glossiness on the surface due to the remaining pigment is greater than necessary, and in some cases it may not be possible to obtain a desired color reproduction range.

In regards to this problem, Japanese Patent Laid-Open No. 2011-218564, for example, discloses a method that adjusts the reflected light on the print medium to a suitable amount and increases the color reproduction range by applying an image enhancing liquid to the printing surface after color pigmented ink is printed in dark areas where a large amount of ink is used.

However, as a result of diligent investigation performed by the inventors, it was found that when multi-pass printing is performed using a printing method such as disclosed in Japanese Patent Laid-Open No. 2011-218564, there are cases in which gloss unevenness appeared by band unit of the image. The mechanism by which this kind of gloss unevenness occurs will be explained below.

Typically, in multi-pass printing, line irregularity and density unevenness that appear in an image are reduced by having the printing head print in an image area that can be printed in one printing scan using a plurality of printing scans sandwiching conveyance operations of the print medium. However, in multi-pass printing, when there is a printing position displacement among a plurality of printing scans due to conveyance error of the print medium or a variation of distance between the print head surface and print medium, there is a possibility of a change in the coverage of dots on the print medium.

For example, in the case of 2-pass multi-pass printing, a group of dots that is printed in the first scan and group of dots that is printed in the second scan normally have an exclusive and complementary relationship. However, when printing position displacement among these dot groups occurs, the complementary relationship is lost, two dots that are supposed to be exclusive overlap, and the coverage of dots on the print medium decreases. As a result, when the printed dots are image enhancing liquid for controlling the glossiness, the glossiness in the area (band) where the printing position displacement occurred becomes different than the other areas, and gloss unevenness can be seen.

SUMMARY OF THE INVENTION

The present invention was invented to solve the problem described above. Therefore, the objective of the present invention is to provide an inkjet printing apparatus that is capable of outputting a high-quality image in which no gloss unevenness due to printing position displacement can be seen when performing multi-pass printing using pigmented ink and an image enhancing liquid for adjusting the glossiness of an image.

In a first aspect of the present invention, there is provided an inkjet printing apparatus that prints an image on a print medium by using a printing head that discharges colored ink and clear liquid, comprising: a dot arrangement data generation unit configured to generate dot arrangement data that sets for each area corresponding to each pixel on a print medium whether to print or not print dot of the colored ink and the clear liquid, based on image data indicating gradation of the image; and a printing unit configured to use the printing head and perform printing of dots of the colored ink and the clear liquid according to the dot arrangement data; wherein the dot arrangement data generation unit generates the dot arrangement data such that an amount of a low-frequency component in the spatial frequency of the dot arrangement for the clear liquid is larger than that for the colored ink on the print medium.

In a second aspect of the present invention, there is provided an inkjet printing method for printing an image on a print medium by using a printing head that discharges colored ink and clear liquid, comprising: a dot arrangement data generation step that generates dot arrangement data that sets for each area corresponding to each pixel on a print medium whether to print or not print dot of the colored ink and the clear liquid, based on image data indicating gradation of the image; and a printing step that uses the printing head and performs printing of dots of the colored ink and the clear liquid according to the dot arrangement data; wherein the dot arrangement data generation step generates the dot arrangement data such that an amount of a low-frequency component in the spatial frequency of the dot arrangement for the clear liquid is larger than that for the colored ink on the print medium.

In a third aspect of the present invention, there is provided an image processing apparatus that applies colored ink including color material and image enhancing liquid to a print medium in order to print an image on the print medium, the image processing apparatus comprising: an obtaining unit configured to obtain image data indicating gradation of the image; and a dot arrangement data generation unit configured to generate dot arrangement data that sets for predetermined area on the print medium whether to print or not print dot for the colored ink and the image enhancing liquid, based on image data obtained by the obtaining unit; wherein the dot arrangement data generation unit generates the dot arrangement data such that an amount of a low-frequency component in the spatial frequency of the dot arrangement for the image enhancing liquid is larger than that for the colored ink on the print medium.

Further features of the present invention will become apparent from the following description of exemplary embodiments (with reference to the attached drawings).

BRIEF DESCRIPTION OF THE DRAWINGS

FIGS. 12A to 12C are drawings that explain a noise matrix;

DESCRIPTION OF THE EMBODIMENTS (Embodiment 1)

In the following, embodiments of the present invention will be explained in detail.

Figure 1:
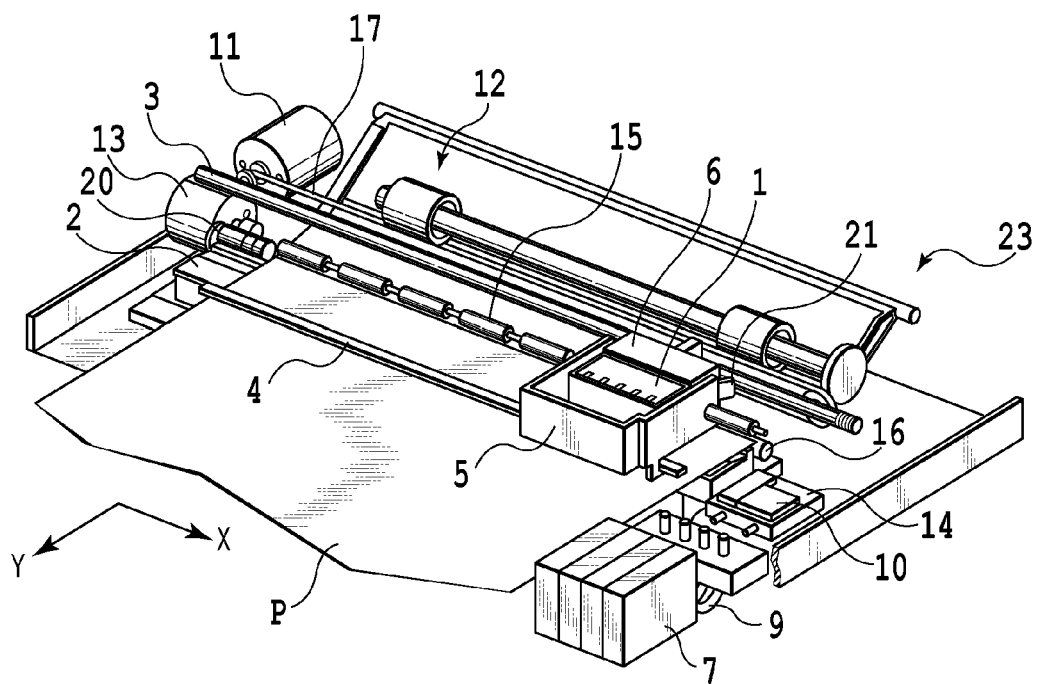
FIG. 1 is a drawing of the internal construction of a serial type inkjet printing apparatus.

FIG. 1 is a drawing of the internal construction of a serial type inkjet printing apparatus that is used in this embodiment. When a print command is inputted, the plurality of print medium P that is stacked in a supply tray 12 is fed in the Y direction one by one toward the printer. A printing head 1 that is mounted in a carriage 5 discharges ink from nozzles while moving back-and-forth in the X direction along a guide rail 4, and forms an image on the fed print medium P. The printing head 1 has a plurality of nozzle arrays that correspond to different colored ink and image enhancing liquid.

Figure 2:
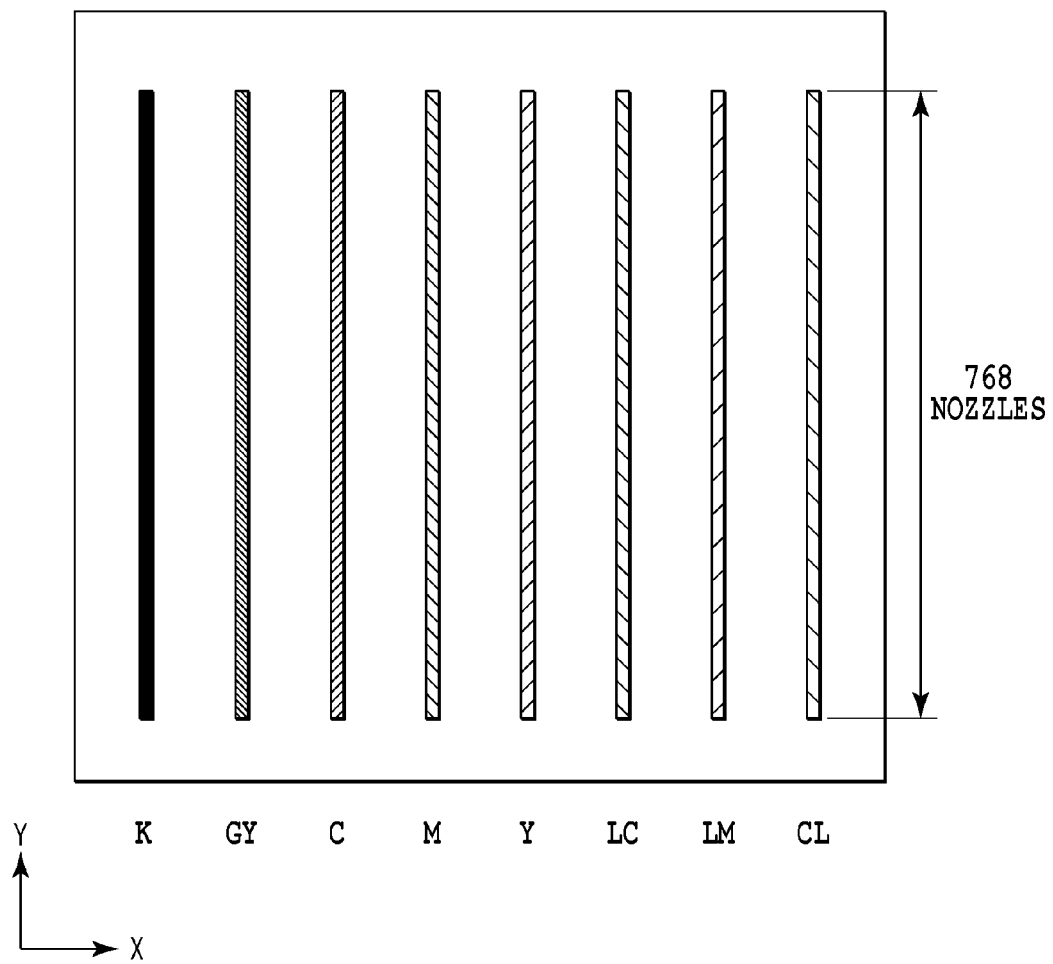
FIG. 2 is a drawing illustrating the arrangement of nozzle arrays in a printing head.

FIG. 2 is a drawing illustrating the arrangement of eight nozzle arrays in the printing head 1. In this embodiment, these nozzle arrays discharge seven colors of color pigmented ink; cyan (C), magenta (M), yellow (Y), black (K), light cyan (LC), light magenta (LM), gray (Gy) and an image enhancing liquid (CL) that is clear liquid for adjusting the glossiness. These nozzle arrays have an equal width in the Y direction, and are arranged in parallel in the X direction. Each nozzle array has 768 nozzles that are arranged in the Y direction at a pitch of 1200 dpi for discharging ink as drops. The amount of a fluid drop that is discharged from each nozzle is 3 pl.

Returning to FIG. 1, the carriage 5 moves back-and-forth in the X direction along a guide shaft 3 and guide rail 4, being driven by the driving force of a carriage motor 11 that is transmitted by way of a timing belt 17. While moving, an encoder sensor 21 that is provided in the carriage 5 reads a linear scale (not illustrated in the figure) that is provided along the X direction, and detects the location and speed of the carriage 5 inside the printer. While the carriage 5 is moving, the printing head 1 discharges ink from the nozzles that are arranged in nozzle arrays according to detected values from the encoder sensor 21 and inputted printing data. As a result, one printing scan is performed by the printing head 1.

An area of the print medium P where printing is performed during the printing scan is smoothly supported with respect to the printing head 1 by being held between a conveyance roller 16 and pinch rollers 15 by the upstream portion thereof, and the back side being supported by a platen 2. Moreover, each time one printing scan is finished, the conveyance roller 16 and pinch rollers 15 rotate, and the print medium P is conveyed by just the amount that corresponds to the printing width of the printing head 1. This conveying operation is performed by the driving force of the conveyance motor 13 rotating the conveyance roller 16 via a linear wheel 20.

By alternately repeating the printing scan and conveyance operations described above, an image is printed on the print medium P.

At the home position there is ink tanks 7 for storing ink to be supplied to the printing head 1, and a head cap 10 and recovery unit 14 for performing maintenance of the printing head 1. When it is necessary to supply ink, the printing head 1 moves to the home position, and ink that is stored in the ink tanks 7 is supplied to the printing head by way of supply tubes 9.

Figure 3:
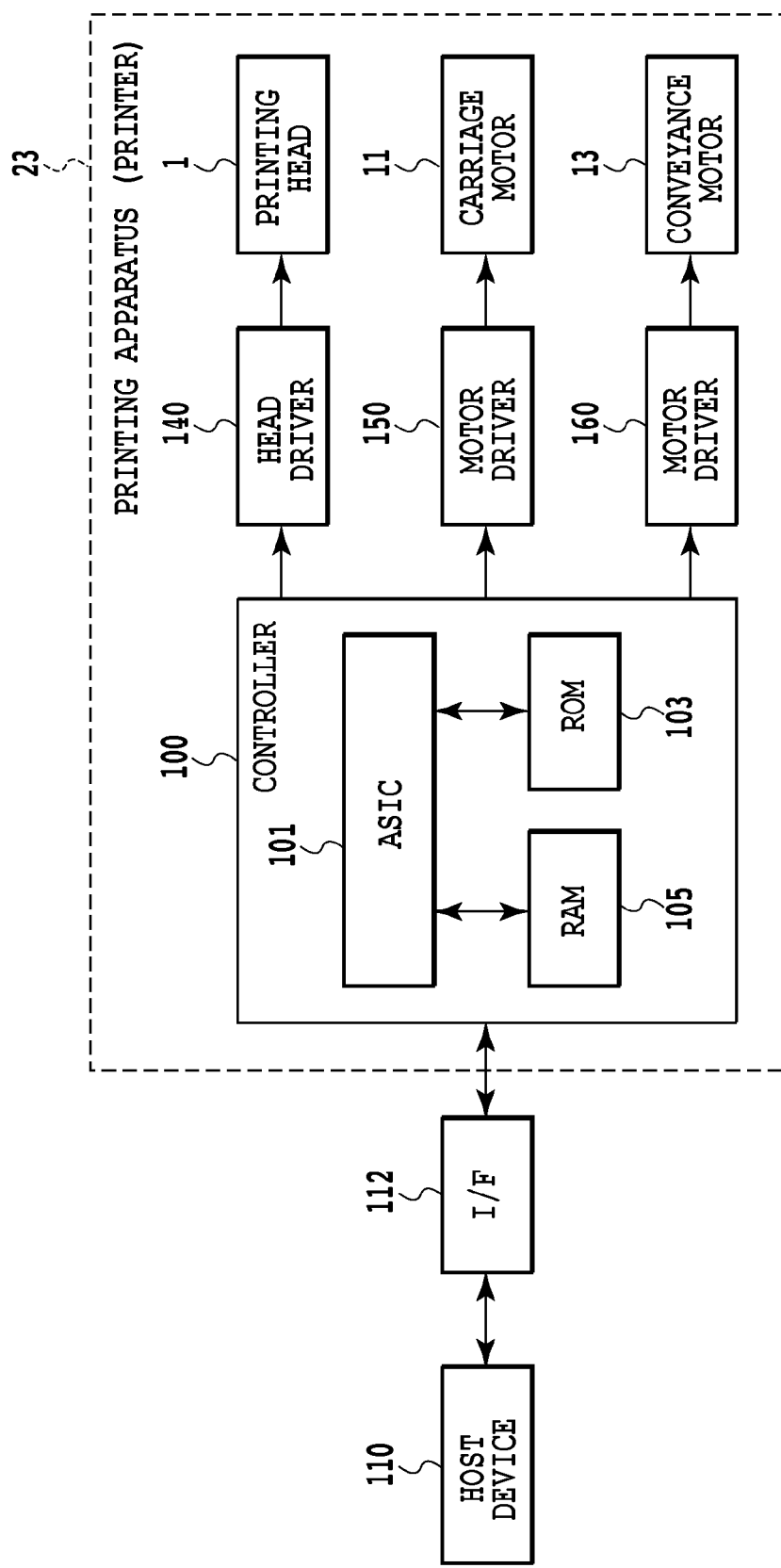
FIG. 3 is a block diagram illustrating control structure of an inkjet printing apparatus.

FIG. 3 is a block diagram illustrating the control structure of the inkjet printing apparatus of this embodiment. A controller 100 is the main control unit, and has an ASIC 101, ROM 103, and RAM 105 in the form of a microcomputer. The ROM 103, in addition to the various programs that are executed by the ASIC 101, stores dot arrangement patterns, mask patterns, and other fixed data that will be described later. Here, the RAM 105 is used as an area for expanding image data, and as a work area. In this embodiment, the ASIC 101 performs specified image processing of image data received from a host device 110 according to a program read from ROM 103, and by controlling various mechanisms such as the printing head 1, prints an image on the print medium P according to printing data after processing.

The host device 110 is a supply source for image data that will be described later (in addition to a computer that generates and manages data such as for an image to be printed, can be also be a reader that reads an image). Image data, other commands, status signals and the like are transmitted to or received from the controller 100 by way of an interface (I/F) 112.

A head driver 140 is a driver that, according to control from the controller 100, drives the printing head 1 according to printing data for which image processing has been performed. A motor driver 150 is a driver that drives the carriage motor 11, and a motor driver 160 is a driver that drives the conveyance motor 13.

Figure 4A:
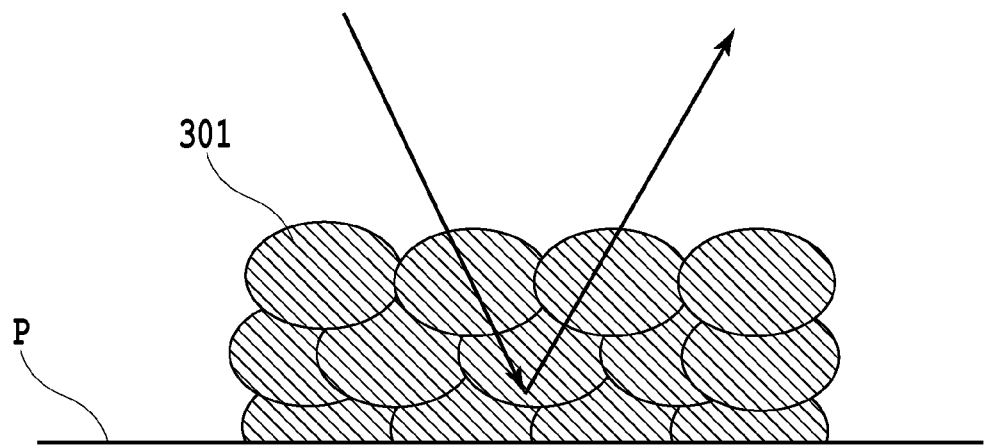
FIGS. 4A and 4B are schematic drawings that illustrate the printed state of colored ink and image enhancing liquid on a print medium.
Figure 4B:
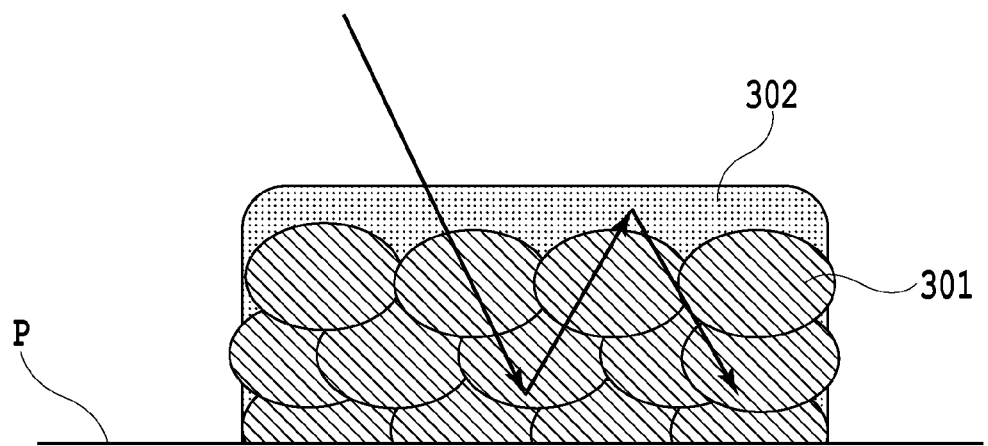

FIGS. 4A and 4B are schematic drawings illustrating the printed state of colored ink and image enhancing liquid on the print medium P. When printing an image in dark areas (high-density areas), a smooth colored ink layer 301 of colored pigmented ink is formed on the print medium P as illustrated in FIG. 4A. When doing this, light that is incident on the printing surface is easily reflected, giving a feeling of glossiness that is higher than necessary. As a result, there is a possibility that it will become difficult to express low brightness, and that the color reproduction range will become narrow.

On the other hand, in this embodiment, image enhancing liquid is printed on the top of the formed colored ink layer 301, to form an image enhancing liquid layer 302 such as illustrated in FIG. 4B. In this case, the image enhancing liquid suppresses the reflected light, so glossiness is reduced. As a result, it is possible to express low brightness more than in the case in FIG. 4A, and it is possible to increase the color reproduction range. In this embodiment, in order to obtain this kind of effect, basically, after a color pigmented ink layer has been printed, image enhancing liquid is printed in order to adjust the glossiness.

When doing this, it is not necessary that the printing density of the image enhancing liquid be 100%. It is possible to obtain sufficient color reproduction range even when the entire surface of the printed image is not covered with the image enhancing liquid, and when too much ink is applied, the amount of ink will exceed the limit for the amount of ink that can be absorbed by the print medium P. Therefore, printing the image enhancing liquid with a printing density that is just able to overcoat the printed pigmented ink is suitable. However, in multi-pass printing, if a printing position displacement occurs among printing scans, there is a large change in the coverage with this amount of printing density, and gloss unevenness may be easily-noticeable.

Figure 5:
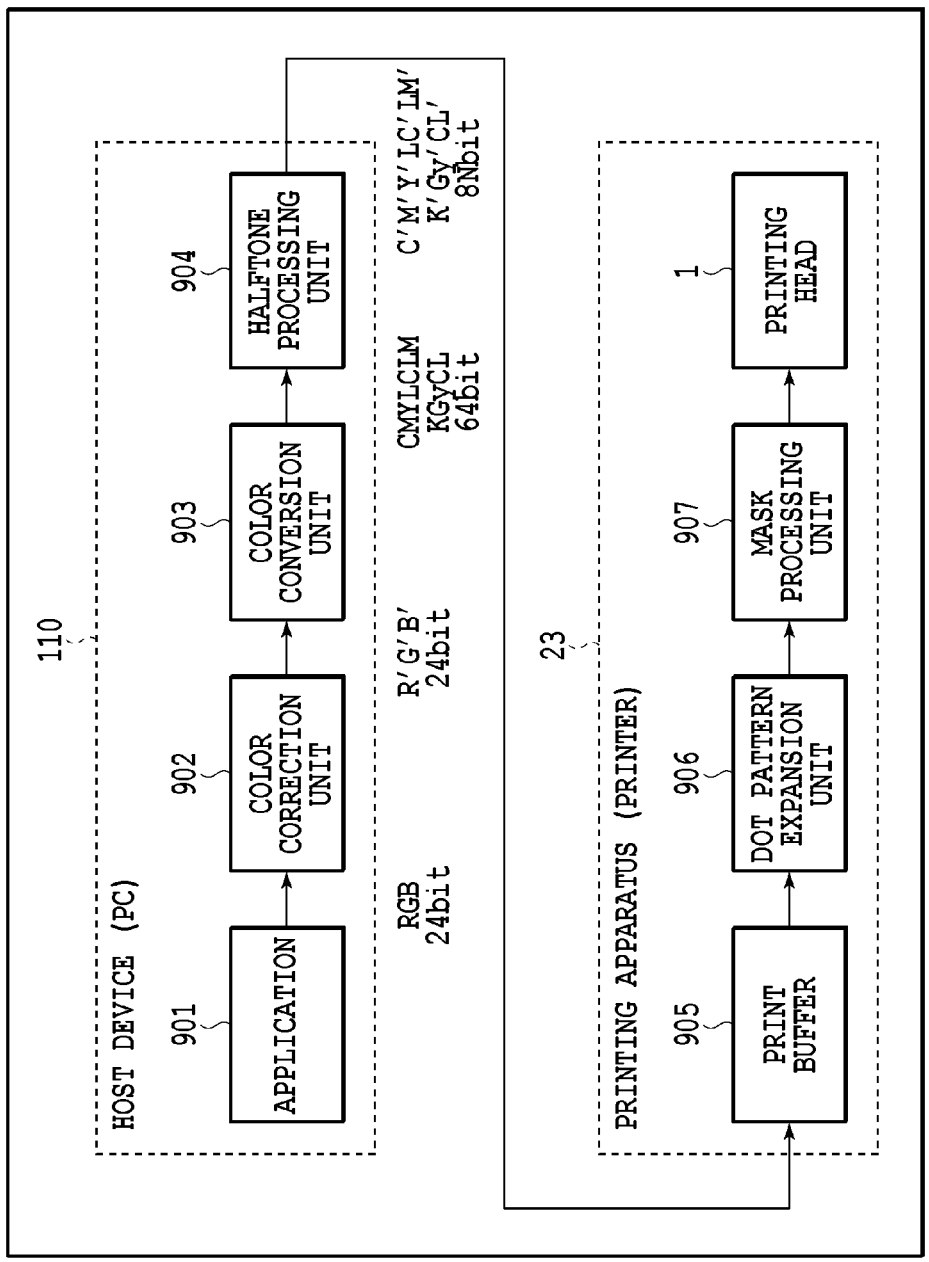
FIG. 5 is a block diagram for explaining the steps of image processing.

FIG. 5 is a block diagram for explaining the steps of the image processing that is executed by the host device 110 and inkjet printing apparatus 23. The host device 110, for example, is a personal computer (PC) and includes various processing configuration that is executed by an application 901 or printer driver. The application 901, based on information specified by a user on the UI screen on the monitor of the host device 110, executes processing to create image data to be given to a color correction unit 902, and executes processing to set printing control information for controlling printing. The image data information and printing control information that are provided by the application 901 is composed of "print medium information", "image information", "printing quality information" and "other control information" such as the feeding method. The print medium information includes the type of print medium that will be the target of printing, and specifies one type of print medium from among normal paper, glossy paper, post card, printable disk and the like. The "image information" is information that indicates the characteristics of the image such as "color mode" or "monochrome mode". The printing quality information specifies the quality of printing, and specifies one type of quality from among "high quality", "normal", "fast" and the like.

The color correction unit 902 performs mapping of the color gamut. This processing performs data conversion in order that the color gamut that is expressed by the sRGB standard input image data (R, G, B) is mapped in a color gamut that can be reproduced by the inkjet printing apparatus of this embodiment. More specifically, 256 gradation data in which R, G and B are expressed by 8 bits each, is converted to 8-bit R', G', B' data (RGB values) of a different color gamut by using a 3D LUT (look up table).

A color conversion unit 903, based on a 3D LUT for later-stage processing, converts the R, G, B data, for which color gamut mapping was performed, to multivalued color data (256-gradation, 8-bit data each) of the combination of colored ink and image enhancing liquid that reproduces the color expressed by this data. In this embodiment, based on the R, G, B data, in addition to seven kinds of multivalued data that respectively correspond to the seven kinds of color ink C, M, Y, K, LC, LM, and Gy, multivalued data CL that corresponds to the image enhancing liquid is generated. In this example, the multivalued data for the image enhancing liquid has a printing density that is just enough to be able to overcoat the printed pigmented ink, so the output signal is at most 128 of the 256 gradations. After that, the generated multivalued data is transmitted to a halftone processing unit 904.

The halftone processing unit 904 performs digital halftoning processing according a multivalued error diffusion method, to convert each 8-bit 256-value color data to each 3-value color data. In this embodiment, characteristics are given to this kind of multivalued error diffusion processing, however the processing method will be explained in detail later.

The image processing from the color correction unit 902 to the halftone processing unit 904 explained above is all performed at a resolution of 1200 ppi (pixels/inch). The printing control information described above, and the 3-value data that was created by the halftone processing unit 904 are outputted to the printer 23.

The 3-value data for which halftone processing has been performed and that is received from the host device 110 is stored in a print buffer 905 for each type of ink.

A dot-pattern expansion unit 906 converts the 1200 dpi 3-value data that is stored in the print buffer 905 to a 2400 dpi×1200 dpi dot arrangement pattern that is indicated by two values; print or no-print.

Figure 6:
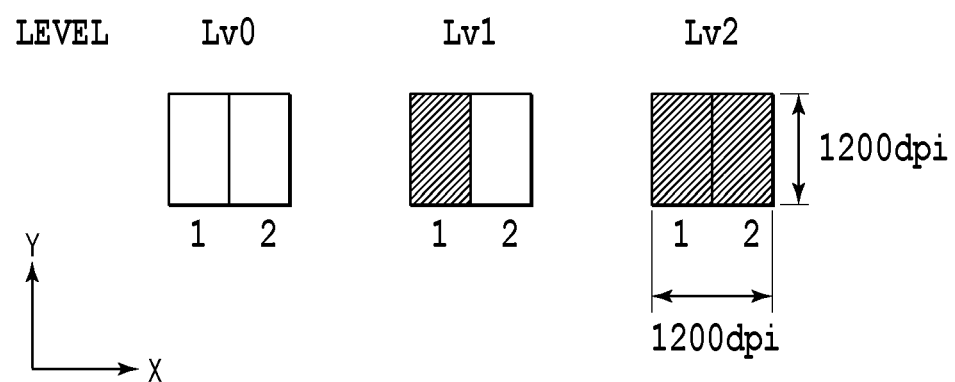
FIG. 6 is a drawing illustrating an example of a dot pattern.

FIG. 6 is a drawing illustrating an example of a dot arrangement pattern. In this embodiment, the 3-value data that is inputted indicates any one level of Lv0 to Lv2, and the dot-pattern expansion unit 906, according to the level, selects one dot pattern from among dot patterns such as illustrated in FIG. 6 that are stored in advance. In the dot pattern, each square represents one 2400 dpi×1200 dpi pixel area, where the dark areas represent a pixel where dots are printed and white areas represent a pixel where dots are not printed. The 3-value data for each color is converted by this kind of dot-pattern expansion unit 906 to binary data. In this way, in this embodiment, by performing image processing for the input RGB image data by the color correction unit 902 to the dot-pattern expansion unit 906, binary dot arrangement data is generated that sets whether to print or not print dot for each area corresponding to each pixel on the print medium. In other words, in this embodiment, the color conversion unit 902 to the dot-pattern expansion unit 906 becomes the dot arrangement data generation unit of the present invention.

Next, the mask processing unit 907 uses mask patterns that are in a complementary relationship with each other to set actual printing scan for each of the pixels for which printing was set by the dot-pattern expansion unit 906.

Figure 7A:
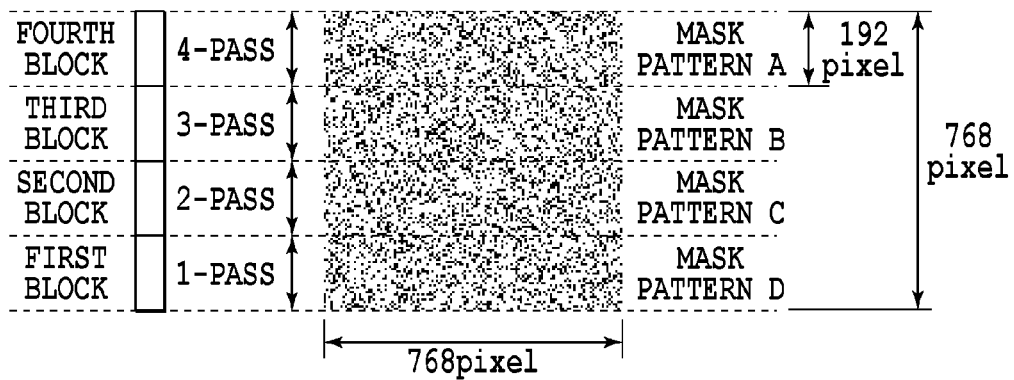
FIGS. 7A and 7B are drawings for explaining a typical multi-pass printing method.
Figure 7B:
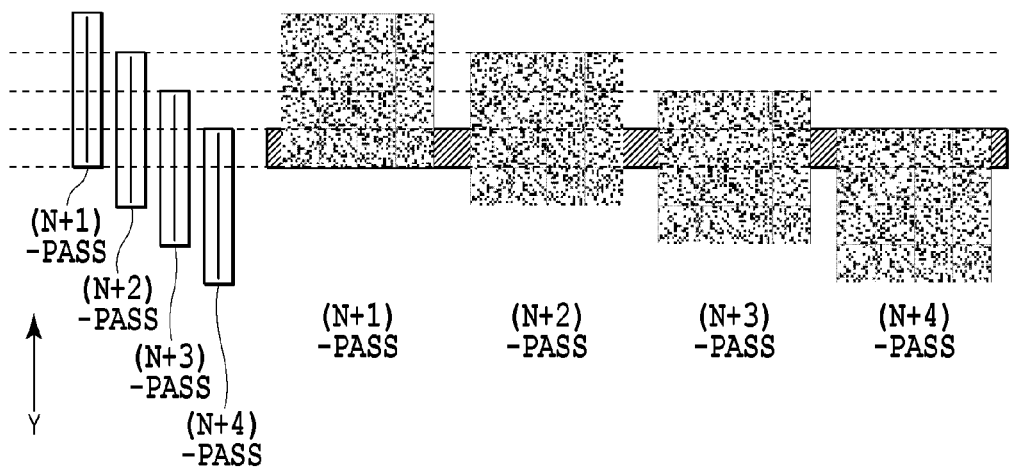

FIGS. 7A and 7B are drawings for explaining a typical multi-pass printing method. In multi-pass printing, an area that can be printed by the printing head in one printing scan is divided into a plurality of printing scans. Here, an example of performing 4-pass multi-pass printing will be explained. In 4-pass multi-pass printing, 768 nozzles that are included in one nozzle array are divided into four blocks having 192 nozzles each, and each block is given a different mask pattern A to D. In these mask patterns, the dark areas represent printing-allowed pixels for which printing of dots is allowed, and white areas represent printing-not-allowed pixels for which printing of dots is not allowed; where the mask patterns A to D have an exclusive and complementary relationship with each other. The figures illustrate that ratio of printing-allowed pixels for the mask patterns A to D to equally be 25%.

FIG. 7B is a drawing explaining the state when performing 4-pass multi-pass printing using the mask patterns illustrated in FIG. 7A. In the case of 4-pass multi-pass printing, each time one printing scan is performed, the print medium is conveyed one block in the Y direction, or in other words the amount of 192 pixels. As a result, the image area on the print medium corresponding to the width of one block is such that printing of an image is 100% completed after four printing scans.

The mask processing unit 907 in FIG. 5 performs logical AND operations between the mask patterns that are prepared in advance in this way and the binary data that is outputted from the dot-pattern expansion unit 906, and for each printing scan, sets the pixels for which dots will actually be printed.

Incidentally, in the multi-pass printing explained above, by giving characteristics to the mask patterns that are prepared, it is possible to perform various printing control. Therefore, in this embodiment, in order to make the timing for printing image enhancing liquid different than that of colored ink, the mask processing unit 907 uses characteristic mask patterns as explained below.

Figure 8A:
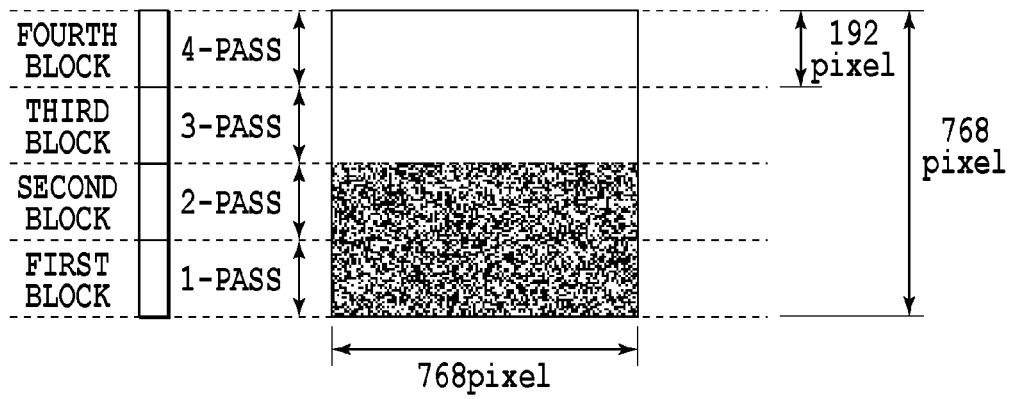
FIGS. 8A and 8B are drawings that illustrate mask patterns that are used.
Figure 8B:
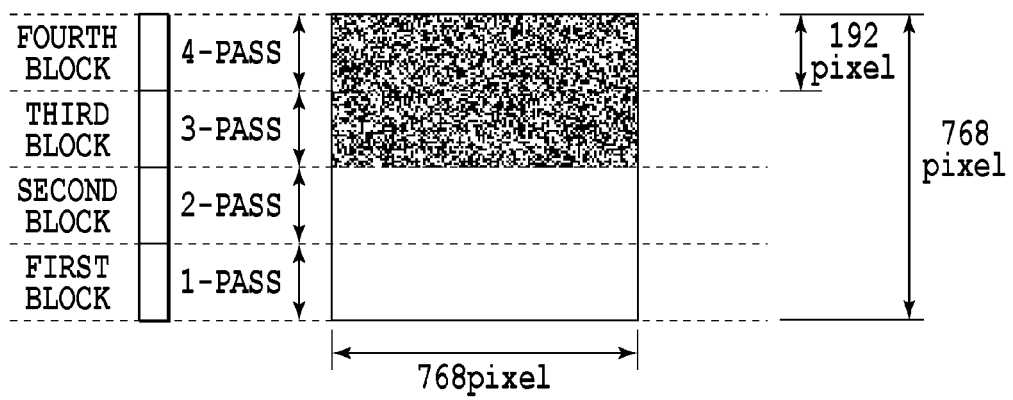

FIGS. 8A and 8B are drawings that illustrate mask patterns that are used by the mask processing unit 907. FIG. 8A is a mask pattern for 7 colors of colored ink that are used by the mask processing unit 907. In the first block and second block, mask patterns that have a complementary relationship with each other and have a printing-allowed rate of 50% are used, and the printing-allowed rate for the third block and fourth block is 0%. On the other hand, FIG. 8B are mask patterns for image enhancing liquid that is used by the mask processing 907. The printing-allowed rate for the first block and the second is 0%, and mask patterns having a complementary relationship with each other and that have a printing-allowed rate of 50% are used for the third block and fourth block.

Figure 9A:
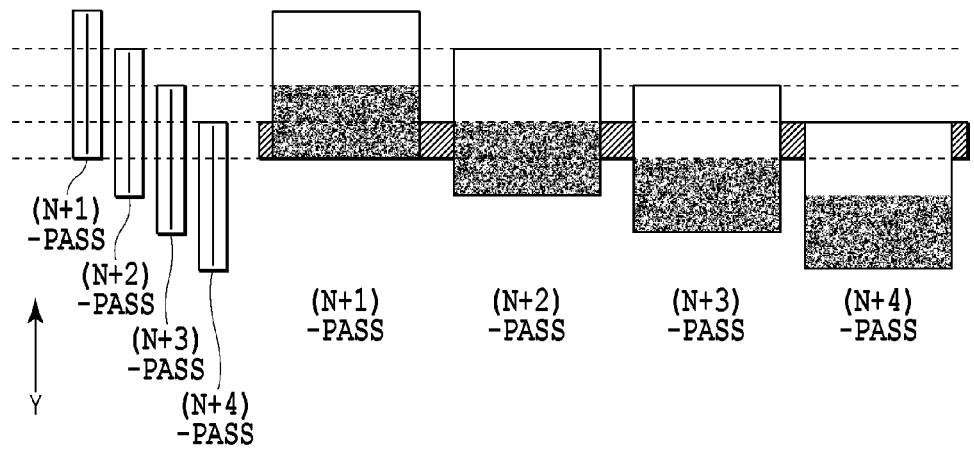
FIGS. 9A and 9B are drawings that illustrate the printed state when multi-pass printing is performed.
Figure 9B:
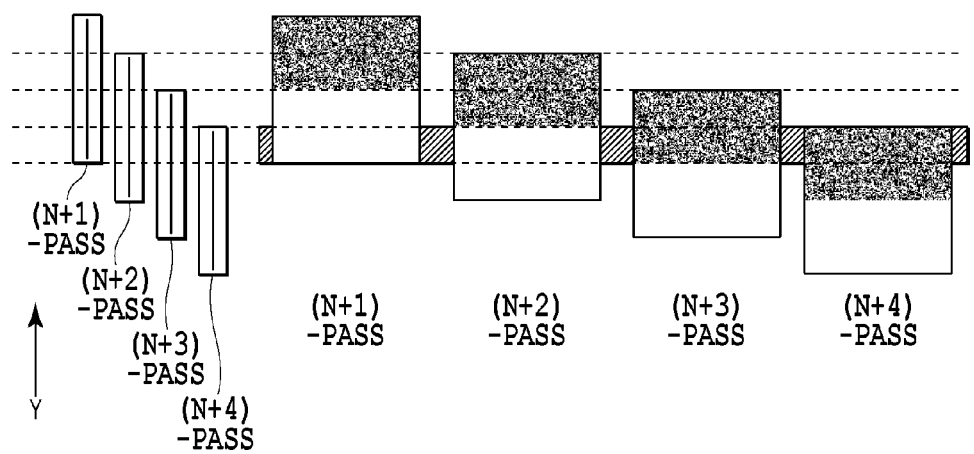

FIGS. 9A and 9B are drawings that illustrate the printing state for the case when 4-pass multi-pass printing that uses the mask patterns illustrated in FIGS. 8A and 8B is performed. The same image area on a print medium that corresponds to one block is such that after printing using the mask patterns illustrated in FIG. 8A is performed for the first pass and the second pass, the mask patterns illustrated in FIG. 8B are used to perform printing in the third pass and fourth pass. In other words, printing of colored ink is completed in the first pass and second pass, after which printing of image enhancing liquid is performed in the third pass and fourth pass.

The binary data generated by the mask processing unit 907 is sent to each of the nozzle arrays in the printing head 1.

Figure 10:
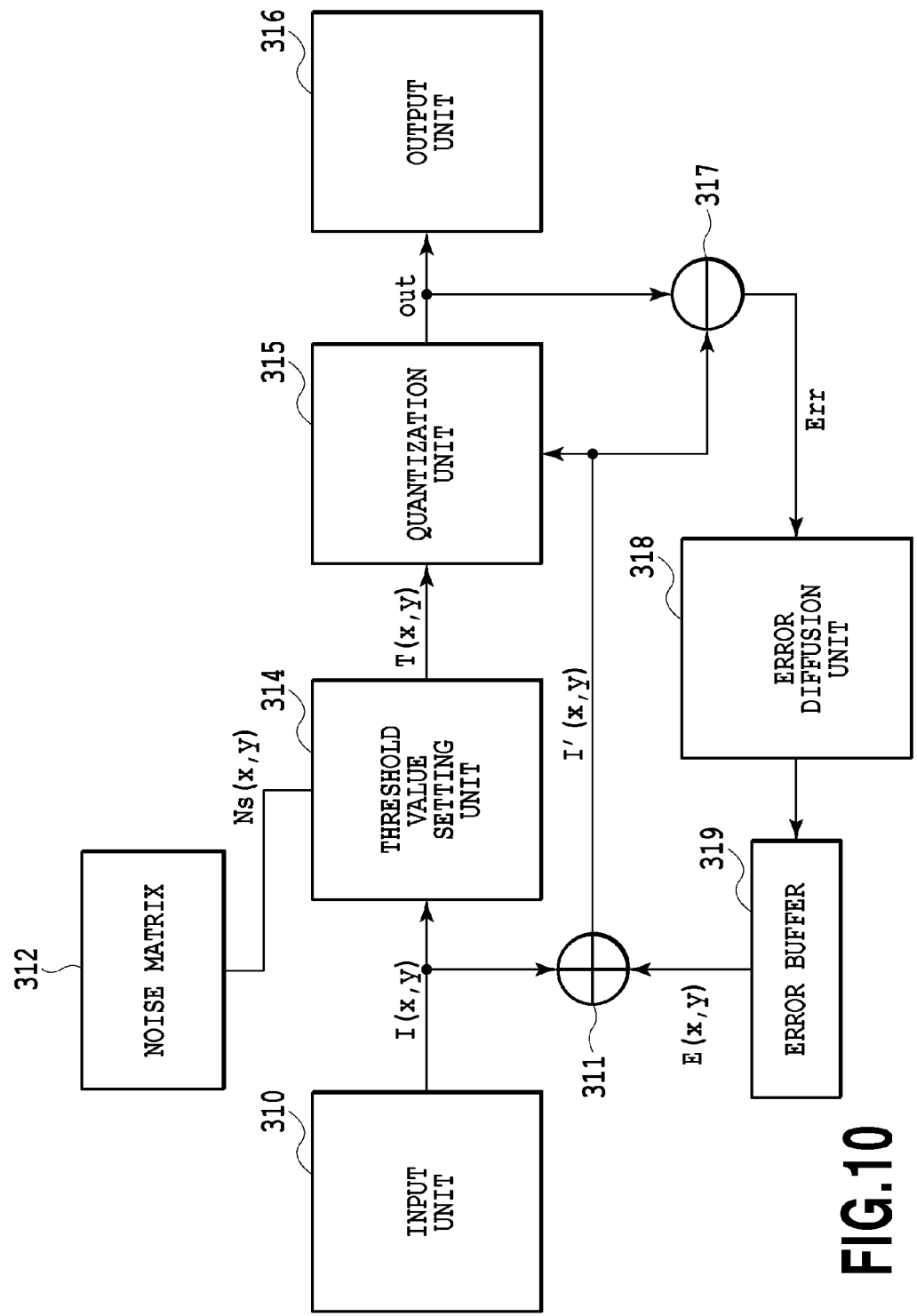
FIG. 10 is a block diagram of a halftone processing unit.

FIG. 10 is a block diagram of the halftone processing unit 904. In this embodiment, this kind of block construction is prepared for each kind of ink. In the following, the halftone processing will be explained in detail for one color of ink or the image enhancing liquid.

Figure 11:
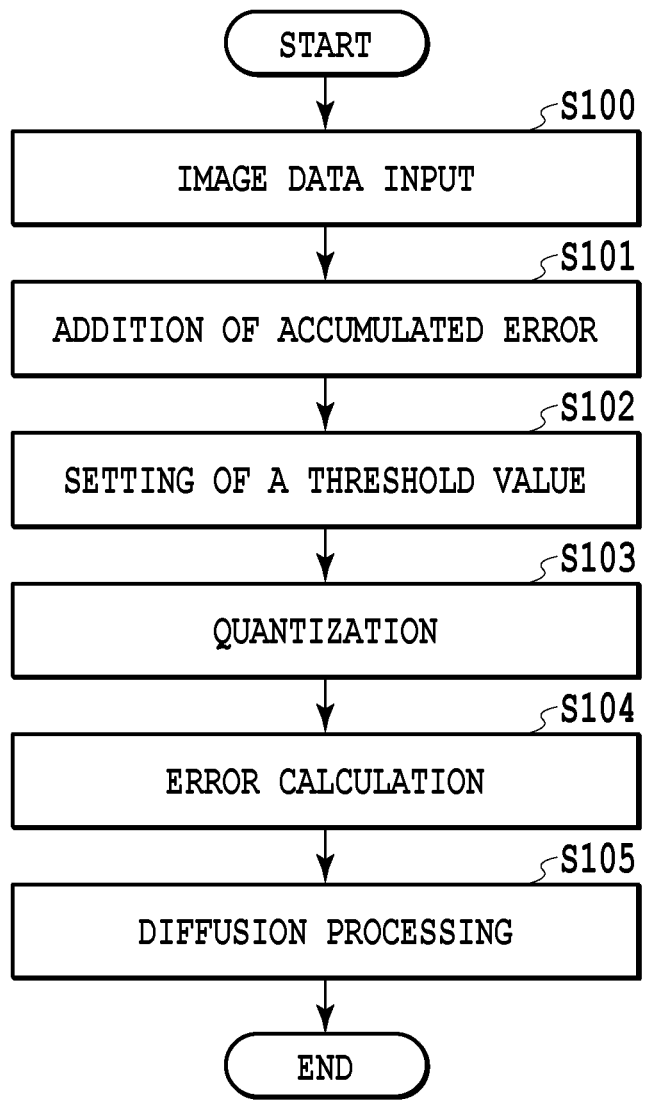
FIG. 11 is a flowchart for explaining the steps of halftone processing.

FIG. 11 is a flowchart for explaining the steps of halftone processing of one color, which correlate the steps with the mechanisms in the block diagram in FIG. 10. First, in step S100, multivalued data for a target pixel (pixel location x, y) is inputted to the input unit 310 from the color conversion unit 902.

Next, in step S101, an accumulated error adding unit 311 selects the error $E(x, y)$ that corresponds to the pixel location $(x, y)$ of the target pixel from among a plurality of errors that are stored in an error buffer 319. Then, this is added to the input data $I(x, y)$ to obtain the error added data $I'$ ($I'(x, y)=I+E(x, y)$). The error buffer 319 has a plurality of memory areas that are correlated to the pixel locations $(x, y)$, and the error value $E(x, y)$ of each area is suitably rewritten by a method that will be described later. The error values $E(x, y)$ in the error buffer 319 are all initialized to 0 when the printing process is started for one page.

In step S102, a threshold value setting unit 314 sets a threshold value $T(x, y)$ according to the noise set by a noise matrix 312 and the multivalued data $I(x, y)$. When doing this, the threshold value setting unit 314 first sets an average threshold value Tav according to the multivalued data $I(x, y)$. More specifically, when the multivalued data $I(x, y)$ is 0 to 127, the average threshold value Tav is Tav=64, and when the multivalued data $I(x, y)$ is 128 to 255, the average threshold value Tav is Tav=192. Then the threshold value setting unit 314 selects Ns $(x, y)$ that is correlated with the pixel location $(x, y)$ from a noise matrix, and by adding that noise to the average threshold value Tav, a threshold value $T(x, y)$ that corresponds to the target pixel is obtained ($T(x, y)=Tav+Ns(x, y)$). The absolute vale of the stored noise is sufficiently small, and the threshold value $T(x, y)$ that is obtained by adding the noise does not exceed another average threshold value Tav.

A quantization unit 315 obtains a quantized value Out by comparing the error added data $I'(x, y)$ that is obtained from the accumulated error adding unit 311 and the threshold value $T(x, y)$ that is obtained from the threshold value setting unit 314 (step S103). More specifically, when Tav=64 and $I'(x, y)<T(x)$, Out=0; when Tav=64 and $I'(x)\geq T(x)$, Out=128; when Tav=192 and $I'(x, y)<T(x)$, Out=128; and when Tav=192 and $I'(x)\geq T(x)$, Out=255. An output unit 316 correlates Lv0 when Out=0, Lv1 when Out=128 and Lv2 when Out=255, and outputs the values to the dot-pattern expansion unit 906.

On the other hand, an error calculation unit 318, in step S104, calculates the difference Err between the output signal Out that was outputted from the quantization unit 315 and the error added data $I'(x, y)$ that is outputted from the accumulative error adding unit 311 (Err=$I'(x, y)$−Out). After that, an error diffusion unit 318 diffuses the error Err to the pixels surrounding the target pixels, and saves the result in the error buffer 319 (step S105).

In this embodiment, error diffusion is performed as below. That is, quantization processing is performed one-by-one pixel in the x direction for an image area having W pixels in the x direction, where
when 1<x<W, $$E(x+1,y) \leftarrow E(x+1,y)+\text{Err}\times 7/16 (x<W)$$

$$E(x-1,y+1) \leftarrow E(x-1,y+1)+\text{Err}\times 3/16 (x>1)$$

$$E(x,y+1) \leftarrow E(x,y+1)+\text{Err}\times 5/16 (1<x<W)$$

$$E(x+1,y+1) \leftarrow \text{Err}\times 1/16 (x<W)$$

when x=1

$$E(x+1,y) \leftarrow E(x+1,y)+\text{Err}\times 7/16 (x<W)$$

$$E(x,y+1) \leftarrow E(x,y+1)+\text{Err}\times 8/16 (x=1)$$

$$E(x+1,y+1) \leftarrow \text{Err}\times 1/16 (x<W)$$

and when x=W $$E(x,y+1) \leftarrow E(x,y+1)+\text{Err}\times 13/16 (x=W)$$

$$E(x-1,y+1) \leftarrow E(x-1,y+1)+\text{Err}\times 3/16 (x>1)$$

The processing above then ends.

Each time the error diffusion process described above is performed for one pixel, the error values $E(x, y)$ for each area in the error buffer 319 are rewritten. Then, when performing the error diffusion process for the next target pixel, in step S101, the accumulated error adding unit 311 adds the most recent error values $E(x, y)$ to the input data $I(x, y)$, to obtain error added data $I'(x, y)$.

Figure 12A:
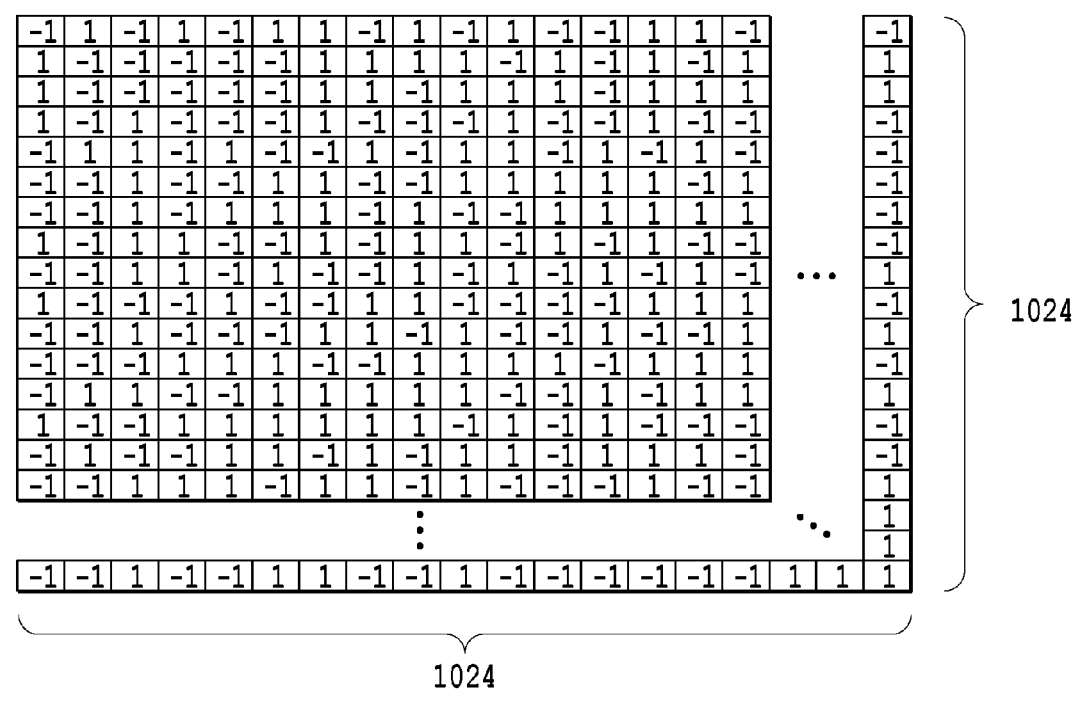
Figures 12B, 12C:
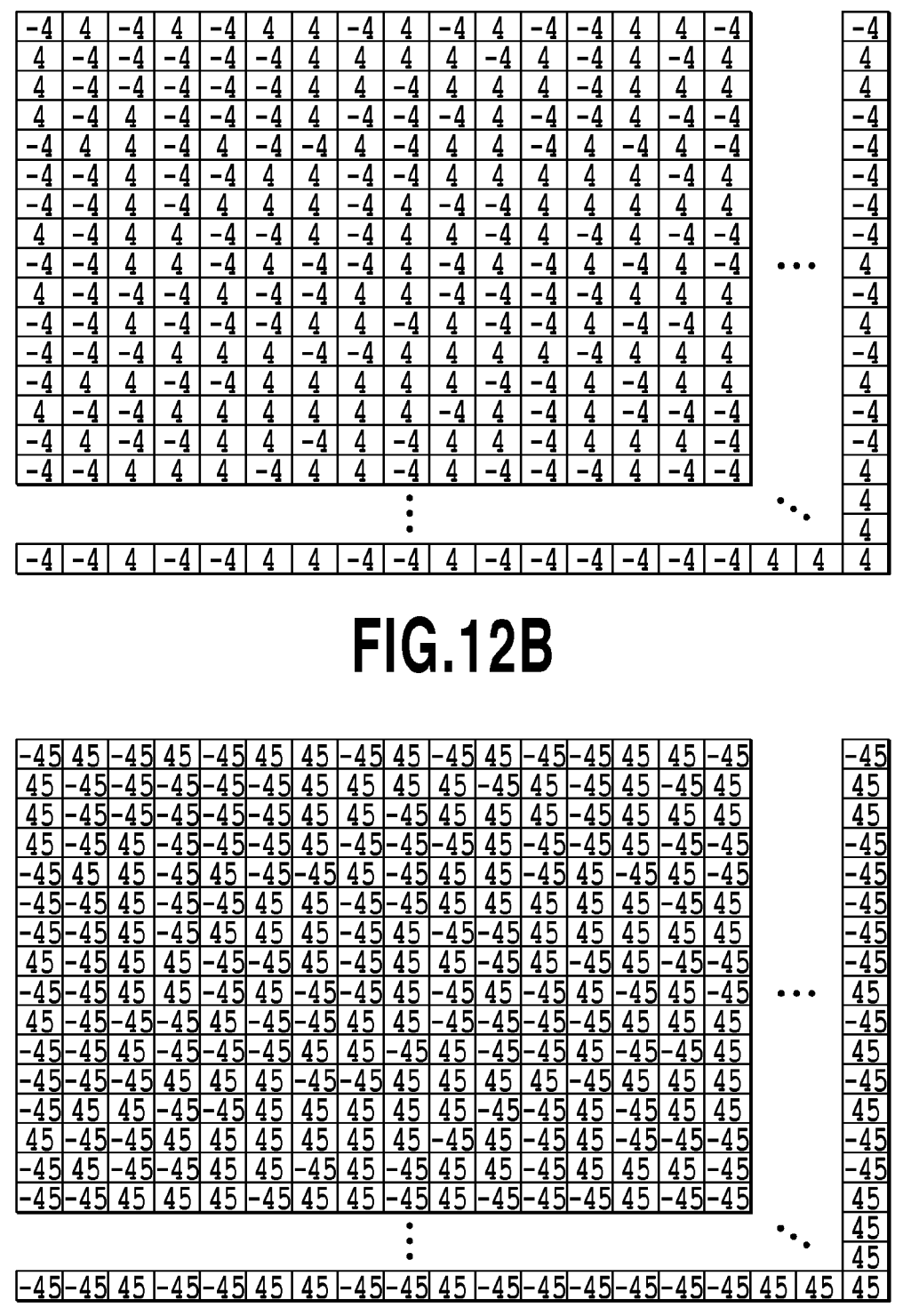

FIGS. 12A to 12C are drawings for explaining the noise matrix that is used in this embodiment. Here, in an x-y area that is composed of 1024 pixels×1024 pixels, noise that corresponds to each individual pixel location is illustrated. First, as illustrated in FIG. 12A, noise such that (+1) and (−1) are randomly assigned to each individual pixel, and after that, the amplitude is increased. FIG. 12B illustrates the case where the amplitude is 4, and FIG. 12C illustrates the case when the amplitude is 45.

In the case of using the noise matrix in FIG. 12B, in step S102 in FIG. 11 for setting a threshold value, the threshold value setting unit 314 selects noise Ns (x, y)=(−4 or +4) according to the (x, y) location of the multivalued data I(x, y). Then, the threshold value setting unit 314 adds this noise to the average threshold value Tav that was set according to the multivalued data I(x, y). In other words, as an example, when the multivalued data I(x, y) is 0 to 127 and the noise Ns (x, y)=−4, the threshold value becomes T(x, y)=64−4=60. Moreover, when the multivalued data I(x, y) is 128 to 255 and the noise Ns(x, y)=+4, the threshold value becomes T(x, y)=192+4=196.

On the other hand, in an example of using the noise matrix in FIG. 12C as well, when the multivalued data I(x, y) is 0 to 127 and the noise Ns (x, y)=−45, the threshold value becomes T(x, y)=64−45=19. Moreover, when the multivalued data I(x, y) is 128 to 255 and the noise Ns (x, y)=+45, the threshold value becomes T(x, y)=192+45=237.

In this way, when using a noise matrix, the larger the amplitude of noise is, the more the threshold value T receives the effect of the noise, and the result of quantization, or in other words, whether or not to print dots tends to be determined according to the distribution of the noise matrix. Conversely, in a case where the amplitude of the noise is small, it becomes difficult for the threshold value T to receive the effect of the noise, and the threshold value does not fluctuate much from the average threshold value Tav. Therefore, the quantization effect, or in other words, whether or not to print dots tends to be determined according to the value of the input multivalued data.

Figure 13A:
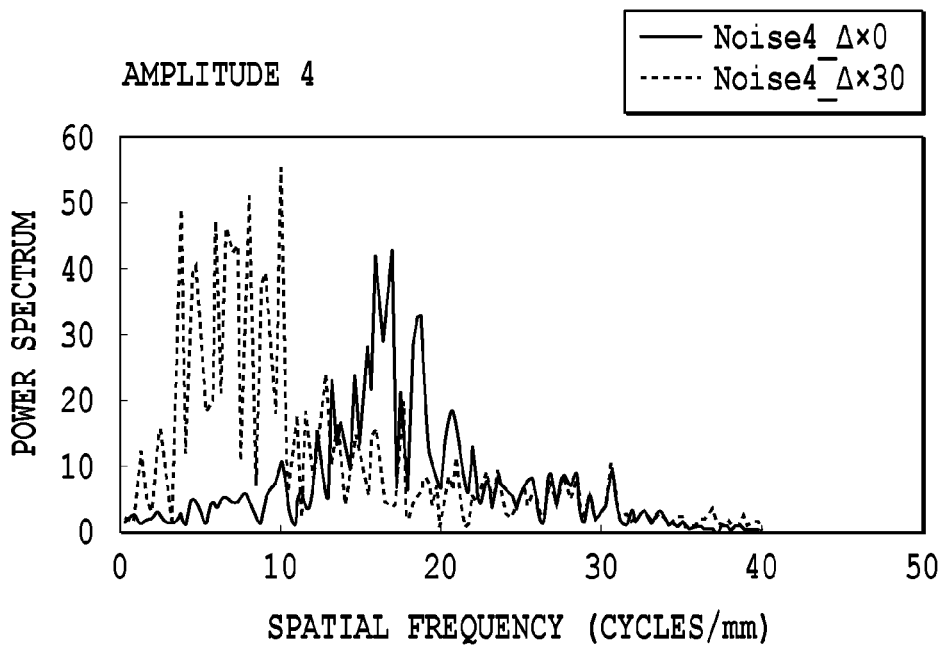
FIGS. 13A and 13B are drawings the illustrate space-frequency distribution when noise matrices having different amplitude are used.
Figure 13B:
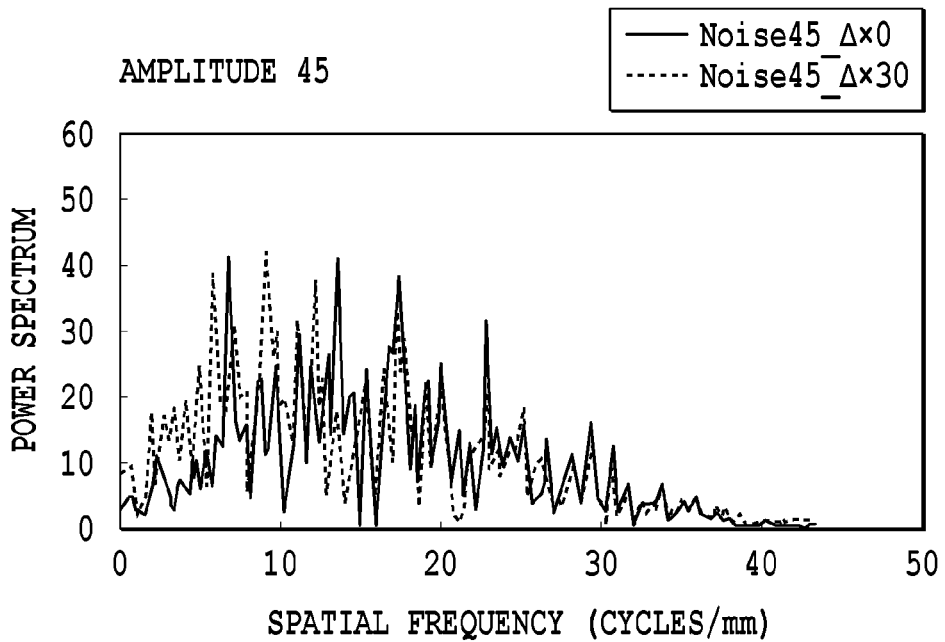

FIGS. 13A and 13B are drawings that illustrate the spatial frequency distribution of an image that is obtained when threshold values are set using noise matrices having different amplitudes as in FIGS. 12A and 12B, the quantization process is performed and an image is printed by 4-pass bidirectional multi-pass printing. In both figures, the solid line indicates the case when there is no displacement in the printing position in two printing scans, and the dashed line indicates the case in which there is about 30 µm of displacement in the printing position in the main scanning direction (forward direction and backward direction) in both the third pass and fourth pass. In comparing both figures, in the state where there was no printing position displacement, there is a power spectrum in nearly the full area for an amplitude of 45; however, at an amplitude of 4, it can be seen that the low frequency component is suppressed. On the other hand, in the state where printing position displacement occurred, the power spectrum at an amplitude of 45 does not fluctuate much when printing position displacement does not occur, however, it can be seen that at an amplitude of 4, the low frequency component greatly increases.

Figure 14A:
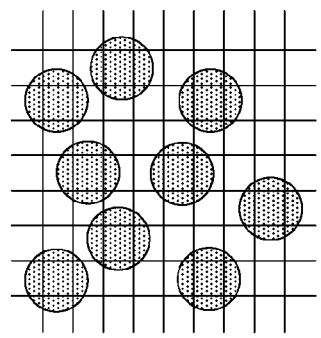
FIGS. 14A to 14D are drawings that illustrate the dot arrangement state.
Figure 14B:
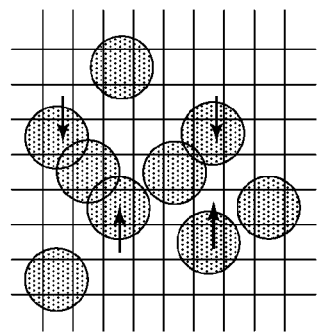

FIGS. 14A to 14D are schematic diagrams illustrating dot arrangement state correspond to the power spectrum above. Here, states are illustrated when multivalued data=32 is inputted for all pixels uniformly. FIG. 14A illustrates the case in which there is no printing position displacement at an amplitude of 4, and FIG. 14B illustrates the case when there is printing position displacement.

In the case when the amplitude is 4, which is relatively small, the average threshold value is maintained at the same value, so as long as there is no printing position displacement, the dots to be printed are arranged in a state having high dispersibility as illustrated in FIG. 14A. However, when there is 30 µm displacement in both the third pass and fourth pass in the opposite direction, dots that were separated overlap, and as illustrated in FIG. 14B, the dot arrangement state becomes coarse. As a result, as illustrated in FIG. 13A, the distribution of the power spectrum changes, and the coverage of dots on the printing medium decreases.

Figure 14C:
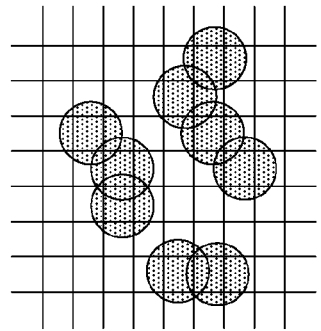
Figure 14D:
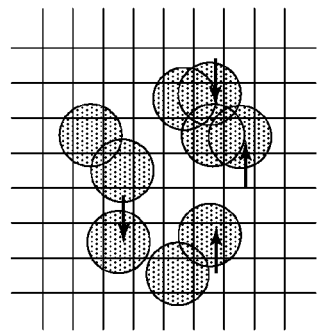

On the other hand, in the case where the amplitude is 45, which is relatively large, the threshold value T is easily affected by the noise, so the dots to be printed also, as illustrated in FIG. 14A, are arranged at random with not so high dispersibility according to the distribution of the noise matrix. In this case, even though printing position displacement does not occur, dots overlap at several locations in the image area. Moreover, even though 30 µm displacement in the main scanning direction of both the third pass and the fourth pass occurs, there are locations where dots that were separated overlap; however, there are also locations where dots that originally were overlapped are separated, and as illustrated in FIG. 14D, the coarseness of the dot crude density does not change much from that in FIG. 14C. There is also little change in the coverage. As a result, as illustrated in FIG. 13B, change in the power spectrum is kept low.

In this embodiment, in order to take advantage of the effect that this kind of difference in amplitude has, two noise matrices are prepared. For colored ink of which the graininess stands out more than that of the image enhancing liquid, a noise matrix having an amplitude of 4 is used. On the other hand, for image enhancing liquid, for which gloss unevenness due to printing position displacement is easy to be a problem, a noise matrix having an amplitude of 45 is used.

Figure 15:
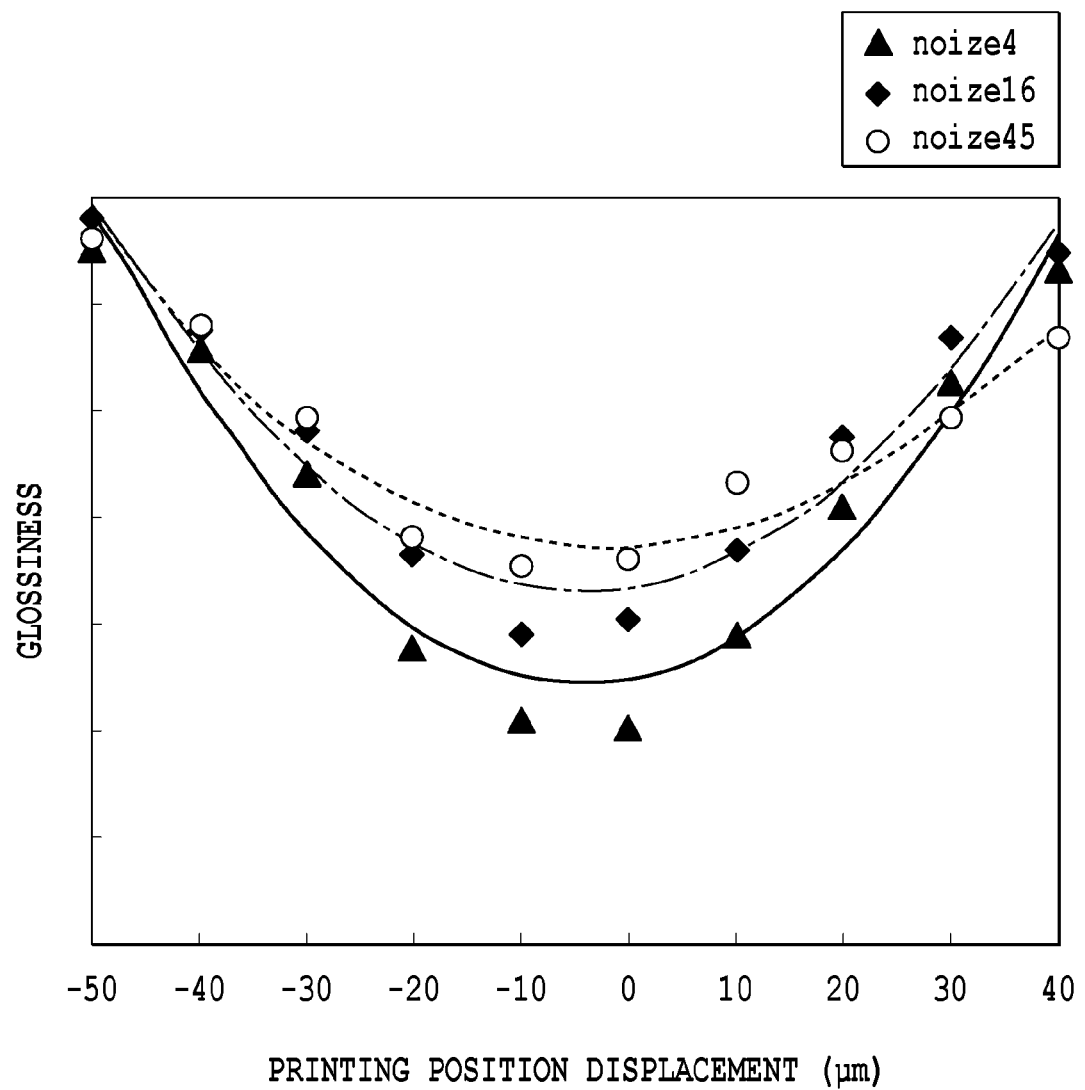
FIG. 15 is a drawing illustrating the relationship between the amount of shifting in the printing location and the change in brightness due to that shift.

FIG. 15 is a drawing illustrating the relationship between the amount of displacement in the printing position and the glossiness that accompanies that displacement. Here, the relationship is illustrated for three stages of amplitude of the noise matrix. As can be seen from the figure, in a case where the amplitude is large the glossiness is maintained, and as the amplitude becomes low, the change in the glossiness becomes greater. This is because, as illustrated in FIGS. 14C and 14D, the larger the value of the amplitude is, there is a tendency for the coverage of dots on the print medium to be kept constant regardless of whether or not there is printing position displacement.

The amplitudes for the colored ink and image enhancing liquid are not limited to the values above. For example, even for colored ink, when the coverage decreases due to printing position displacement, the image density decreases, and this may be felt as density unevenness. Therefore, for colored ink, the amplitude should be set appropriately while keeping a balance between both graininess and density unevenness. When there are differences in how much the graininess and density unevenness stand out among colored ink, it is possible to prepare different amplitudes (different noise matrices) for those inks.

For image enhancing liquid, when the dispersibility is too low, it is not possible to obtain sufficient coverage on the printing surface, and there is a possibility that a high glossiness cannot be suppressed, and highly precise color reproduction can not be obtained. Therefore, for the image enhancing liquid, an appropriate amplitude should be set while keeping a balance between color reproduction and gloss unevenness due to printing position displacement.

For any ink, an appropriate amplitude should be set. However, when comparing these, the bad effect of gloss unevenness due to a printing position displacement is greater for image enhancing liquid than colored ink, so in this embodiment, for these two different kinds of ink, two noise matrices having different dispersibility are prepared.

(Embodiment 2)

In this embodiment, a method of determining the dot arrangement of colored ink and image enhancing liquid in correlation with human visual performance will be explained.

Figure 16:
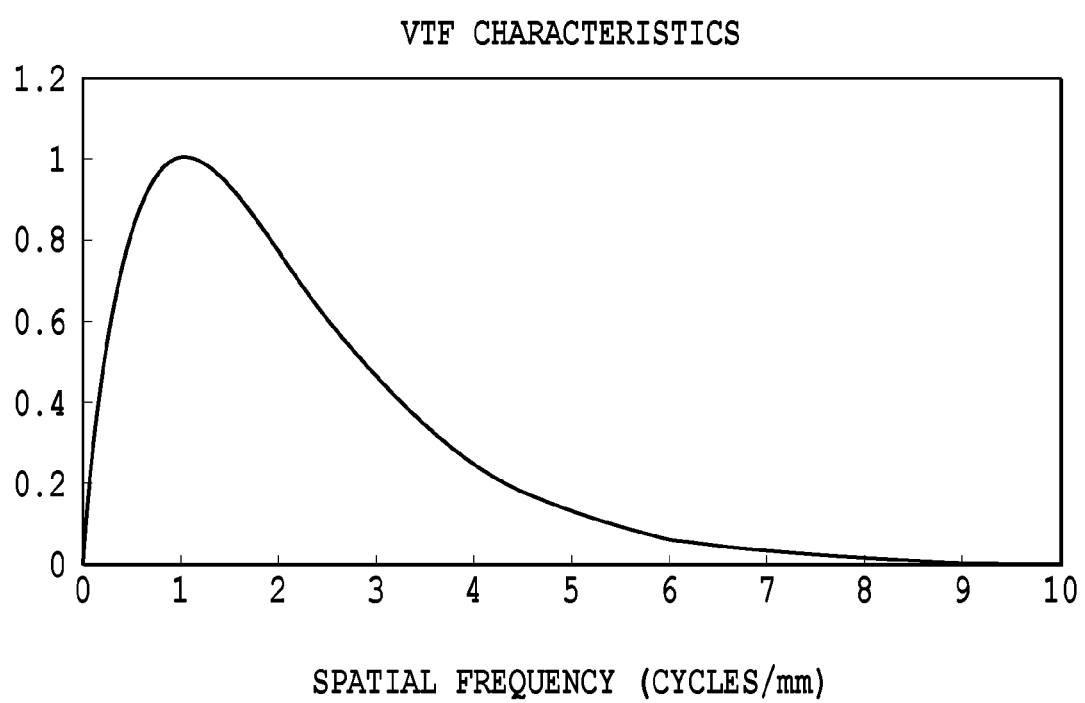
FIG. 16 is a drawing that illustrates the humanly visible spatial frequency characteristic VTF.

FIG. 16 is a drawing illustrating the humanly visible spatial frequency characteristics VTF (Visual Transfer Function) at a standard 300 mm observation distance. An evaluation function has been proposed according to this VTF characteristic by Dooley (Roetling: "Visual Performance and Image Coding", Image Processing, SPIE/OSA Vol. 74, pp 195 to 199 (1976)), and defined by the following equation.

$$VTF = 5.05 \times \exp(-0.138 \times u) \times (1 - \exp(-0.1 \times u))$$

where
$u = f \times R \times n/180$ (cycles/degree)
f: Spatial frequency (cycles/mm)
R: Observation distance (mm)

According to the figure, near 1 cycle/mm, visual sensitivity is the highest, and when the frequency becomes higher than that, the sensitivity gradually decreases. In an inkjet printing apparatus such as in this embodiment, dots having a diameter of tens of microns are printed at a resolution of 1200 dpi or greater, so when compared to the peak value it is difficult for the dots to stand out sufficiently at high frequency. However, as the arrangement period becomes larger and a low-frequency component appears, the spatial frequency approaches the peak value, and there is a possibility that graininess and texture will be noticed.

This type of low-frequency component is especially noticeable for colored ink. Even though the low-frequency component of the colorless and transparent image enhancing liquid may be greater than that of colored ink, it is difficult to notice the problem on the image. On the other hand, gloss unevenness that accompanies a printing position displacement becomes a problem more easily than density unevenness of colored ink. From this kind of observation, in this embodiment, processing is performed so that the low-frequency component of dot arrangement becomes greater for image enhancing liquid than for colored ink. More specifically, as in the first embodiment, a noise matrix having an amplitude of 4 as illustrated in FIG. 12B is used for colored ink, and a noise matrix having an amplitude of 45 as illustrated in FIG. 12C is used for image enhancing liquid. In this embodiment, by using the noise matrix having an amplitude of 4 that is illustrated in FIG. 12B, the dot arrangement on the print medium of colored ink hardly includes a low-frequency component in the spatial frequency that is 10 cycles/mm or less. On the other hand, by using the noise matrix having an amplitude of 45 that is illustrated in FIG. 12C, the dot arrangement of image enhancing liquid includes a large low-frequency component that is 10 cycles/mm or less.

Figure 17A:
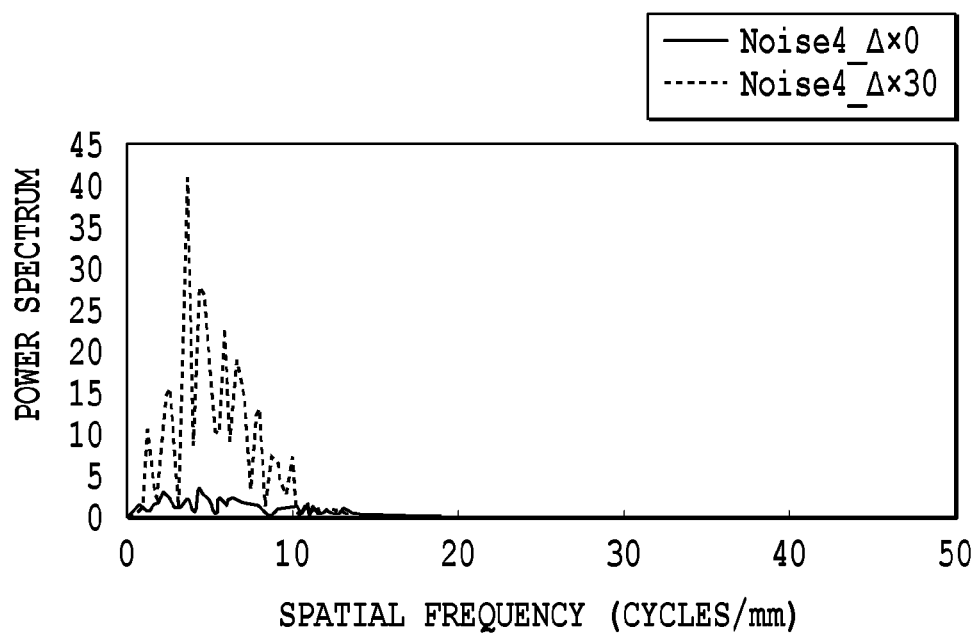
FIGS. 17A and 17B are drawings that illustrate the space-frequency distribution when different noise matrices are used.
Figure 17B:
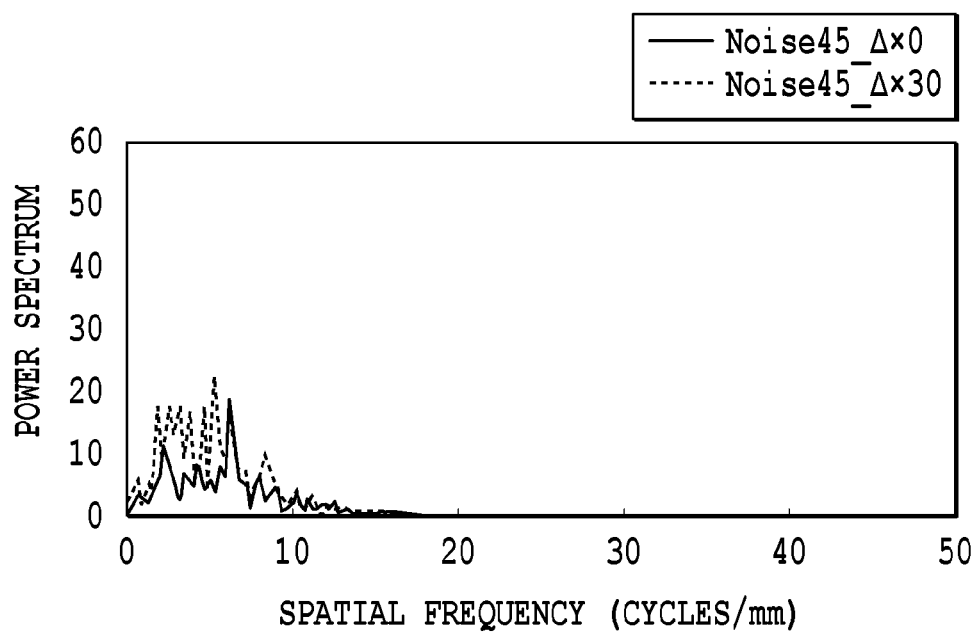

FIGS. 17A and 17B are drawings that illustrate the spatial frequency distribution when uniform multivalued data=50 is inputted for all pixels, and an image is printed using 4-pass bi-directional multi-pass printing that uses the two noise matrix above. As in FIGS. 13A and 13B, in a state when there is no displacement of the printing position, even though a power spectrum occurs at the spatial frequencies for nearly the entire range at an amplitude of 45, the low-frequency component is suppressed at an amplitude of 4. In a state where printing position displacement occurs, the power spectrum at an amplitude of 45 does not change from when the printing position displacement did not occur, and the low-frequency component at an amplitude of 4 greatly increases. However, even in the case where the printing position displacement occurred, the peak of the power spectrum is around 5 cycles/mm, and the VTF peak, which is 1 cycle/mm, is kept low. In this way, it is preferred that even though the estimated printing position displacement occurred noise in which the peak of the power spectrum does not match the VTF peak is set by the noise matrices in advance.

In other words, for colored ink, an appropriate amplitude should be set while keeping a balance between both the graininess and the power spectrum when printing position displacement occurred. For image enhancing liquid, an appropriate amplitude should be set while keeping a balance between the color reproduction and gloss unevenness that occurs due to printing position displacement.

The effect of the noise matrices on the visual performance as explained above changes depending on the resolution of the printer, the diameter of the dots, the size of the noise matrices, the number of multi passes and the like. Therefore, the size and amplitude of a noise matrix for colored ink, and a noise matrix for image enhancing liquid should be set in consideration of these parameters, so that as much as possible the power spectrum that changes according to printing position displacement does not include the VTF peak.

(Embodiment 3)

In the embodiments above, as was explained with reference to FIGS. 12A to 12C, for colored ink and for image enhancing liquid, noise matrices having an area of 1024 pixels×1024 pixels were prepared. However, for colored ink for which the amplitude is small, and the quantization result, or in other words dot arrangement, is not easily affected by the noise matrix the effect on the image does no easily appear even when the size of the noise matrix is reduced. On the other hand, for image enhancing liquid for which the amplitude is large and the quantization result is easily affected by the dispersibility of the noise matrix, as the size of the matrix is made smaller, there is a possibility that the period due to the size will be detected and recognized as texture. Therefore, in this embodiment, only the size of the noise matrix for colored ink, having a small amplitude, is reduced to 128 pixels×128 pixels, and the size of the noise matrix for image enhancing liquid, having a large amplitude, is kept at 1024 pixels×1024 pixels.

With the configuration above, it is possible to conserve memory space that is prepared for noise matrices, while still obtaining the same effect as in the first embodiment.

(Embodiment 4)

In the embodiments explained above, a method was explained in which, by using the mask patterns in FIGS. 8A and 8B, image enhancing liquid is printed after printing of colored ink has been completed. However, depending on the type of print medium and image, there are cases in which it is possible to favorably adjust the glossiness after printing even when image enhancing liquid is not coated over colored ink, or in other words, even when colored ink and image enhancing liquid are printed in the same printing scan.

Therefore, in this embodiment, in consideration of such a case, a first printing mode in which an overcoat of image enhancing liquid is performed after printing colored ink, and a second printing mode in which colored ink and image enhancing liquid are printed in the same printing scan are prepared. When the first printing mode is set, the image processing method and printing method explained for the first embodiment are employed. In other words, multivalued data for colored ink is quantized using the noise matrix having a small amplitude that is illustrated in FIG. 12B, and printed according to the mask pattern illustrated in FIG. 8A. Moreover, multivalued data for image enhancing liquid is quantized using the noise matrix having a large amplitude that is illustrated in FIG. 12C, and printed according to the mask pattern illustrated in FIG. 8B.

Figure 18:
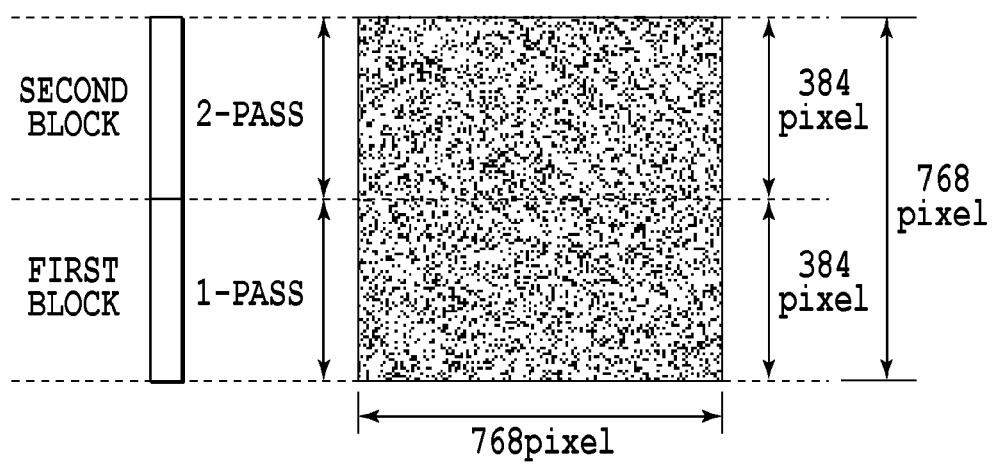
FIG. 18 is a drawing illustrating a mask pattern having an allowable printing rate of 50%.

On the other hand, for the second printing mode, the colored ink and image enhancing liquid are printed in the same printing scan, so change in the glossiness when printing position displacement occurred is kept small compared to when an overcoat of image enhancing liquid is performed. Therefore, the degree of gloss unevenness that occurs due to printing position displacement is lessened. For this reason, in the second printing mode of this embodiment, the same noise matrix is used for both image enhancing liquid and colored ink. More specifically, both multivalued data for colored ink and multivalued data for image enhancing liquid are quantized using the noise matrix having a small amplitude that is illustrated in FIG. 12B, and 2-pass multi-pass printing is performed according to a mask pattern having a 50% allowable printing rate such as illustrated in FIG. 18. This kind of second printing mode can output an image at higher speed than 4-pass multi-pass printing that the first printing mode employs.

(Embodiment 5)

In the embodiments explained above, the dot arrangement on the print medium was controlled by giving characteristics to the noise matrices that are referenced in the error diffusion process. However, in this embodiment, a dithering method is used as the quantization method, and dot arrangement on the print medium is controlled by giving characteristics to the dithering pattern that is referenced in the dithering process.

In the dithering method, by referencing a dithering pattern for which threshold values are set in advance for each pixel, the multivalued data of each pixel is quantized. In the case of binarization, the data is quantized to either printing (1) or no-printing (0), and in the case of quantizing into three values such as in the embodiments above, the data is quantized to level 2, level 1 or level 0. When doing this, by giving characteristics to the threshold value array of the dithering pattern, it is possible to adjust the dot dispersibility, or in other words, the spatial frequency.

For example, in the case of a dithering pattern in which the threshold values are set in order of increasing value for each individual pixel in a state of high dispersibility, the dot dispersibility is high, and a power spectrum with a suppressed low-frequency component is obtained. On the other hand, in the case of a dithering pattern in which low threshold values are gathered together, the sense of graininess in highlighted sections becomes low.

Therefore, in this embodiment, dithering pattern characteristics such as this are used, and a dithering pattern for which the dispersibility is relatively high and the low-frequency component is suppressed is prepared for colored ink, and a dithering pattern for which the dispersibility is relatively low and the low-frequency component is high is prepared for image enhancing liquid. By performing 4-pass multi-pass printing using the same mask pattern as in the first embodiment, it is possible to output a high-quality image as in the first embodiment in which a sense of graininess is suppressed for colored ink, and gloss unevenness is suppressed for image enhancing liquid. In this embodiment that employs a dithering process such as this, it is not necessary to prepare a circuit for performing the error diffusion process as illustrated in FIG. 10, and so it is possible to perform quantization using simpler construction than in the error diffusion process.

(Embodiment 6)

In the embodiments above, image enhancing liquid was mainly used for performing an overcoat of the printed surface of colored ink; however, it is possible that the effect of the image enhancing liquid may be obtained even when printed at the same timing as the colored ink. For example, in the case of a print medium having low glossiness, the glossiness may be insufficient in highlighted sections where not much colored ink is printed, in such a case, it is possible to print image enhancing liquid in the same printing scan as colored ink for areas where colored ink is not printed. Moreover, other than glossiness, there are cases in which it is preferable to print image enhancing liquid in the same printing scan as colored ink in order to maintain image clarity in a target range, or in order to maintain the limited amount of ink that can be absorbed by the print medium.

Therefore, in this embodiment, image enhancing liquid for performing an overcoat over colored ink, and image enhancing liquid for printing at the same time as colored ink are prepared. Therefore, in the color conversion unit 903 illustrated in FIG. 5, in addition to generating seven types of multivalued data for the seven kinds of colored ink, C, M, Y, K, LC, LM, Gy based on R, G, B multivalued data, first multivalued data CL1 and second multivalued data CL2 corresponding to image enhancing liquid are generated. Here, CL1 is color separation data for image enhancing liquid that is for printing in the same printing scan as colored ink, and CL2 is color separation data for image enhancing liquid that is for printing in a scan after colored ink.

Figure 19:
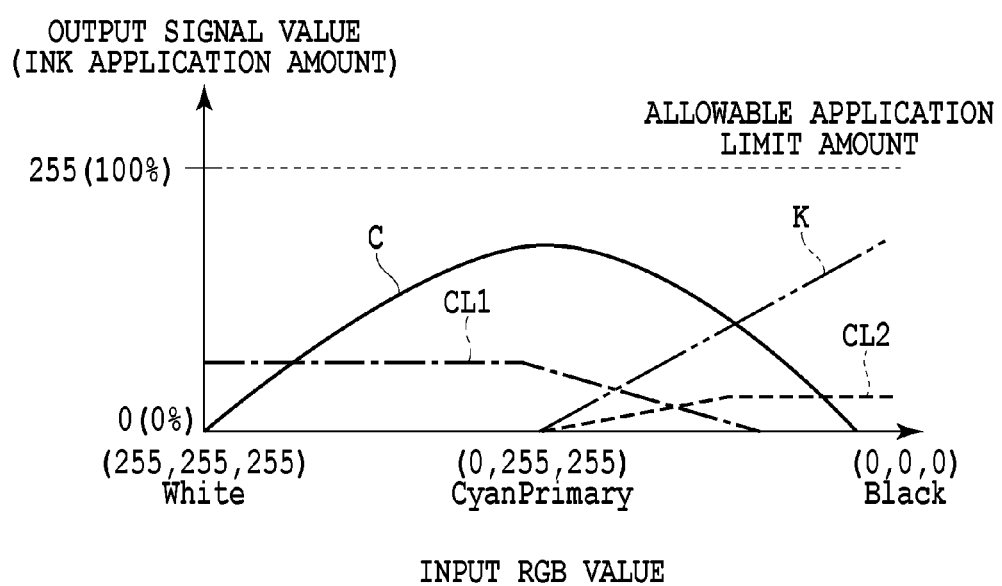
FIG. 19 is a drawing that explains signal value conversion that is executed by a later-stage processing unit.

FIG. 19 is a drawing for explaining an example of signal value conversion that a color conversion unit 903 executes in this embodiment. The horizontal axis indicates input signal values of the cyan line from white, which is (R, G, B)=(255, 255, 255), passing through cyan, which is (R, G, B)=(0, 255, 255), and going toward black, which is (R, G, B)=(0, 0, 0). The vertical axis indicates the output signal values for C (cyan), K (black) CL1 (first multivalued data for image enhancing liquid) and CL2 (second multivalued data for image enhancing liquid) that correspond to each of the input signal values.

For the cyan line, the output signal value C for cyan ink increases gradually from 0 and reaches a peak at cyan (0, 255, 255), and then decreases gradually toward black and becomes 0 at black. On the other hand, the output signal K for black ink is 0 up to cyan (0, 255, 255), then increases gradually after that to become a MAX at black. In this way, the output signal value, the total and the ratio for cyan C and black K change according to the input signal value. The output signal value is correlated with the amount of ink applied per unit area, so that the glossiness and image clarity of a printed surface that is represented using colored ink change according to the input signal value.

In this embodiment, the first multivalued data CL1 for the image enhancing liquid that is printed at the same time as the colored ink, and the second multivalued data CL2 for the image enhancing liquid that is printed after the colored ink are adjusted according to the output values of the colored ink signals, and so the glossiness and image clarity are more actively controlled. Therefore, referencing FIG. 19, in this embodiment, in a range from a highlight where the printing density of dots is relatively low to cyan primary having an intermediate density, CL1 (first multivalued data) is mainly generated. And in a range from cyan primary having a relatively high printing density of dots to black, CL1 is gradually reduced to 0, and together with reducing CL1, CL2 (second multivalued data) is gradually increased. In other words, in a range from the highlight to cyan primary, the image enhancing liquid is applied at the same timing as cyan ink. On the other hand, in areas near black, the image enhancing liquid is applied after the cyan ink and black ink have been printed, and overcoats the colored ink. In either case, an amount of image enhancing liquid that is suitable for the amount of colored ink applied is printed at appropriate timing, and thus it is possible to suppress gloss unevenness in all of the color areas.

An example of a cyan line is explained in FIG. 19, however, this kind of adjustment can be used at all gradations for all colored ink. In this case, CL1 and CL2 that are suited for multivalued data (C, M, Y, K) that is converted from the input signal values (R, G, B) may be correlated in a 3D LUT that is referenced by the later-stage processing unit 903.

Figure 20A:
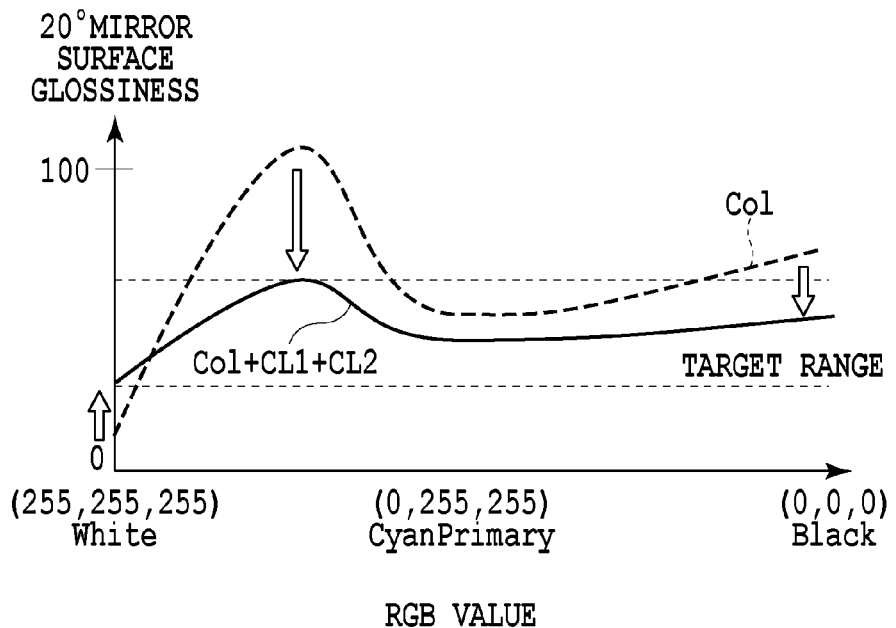
FIGS. 20A and 20B are drawings for explaining the change in brightness and image clarity.
Figure 20B:
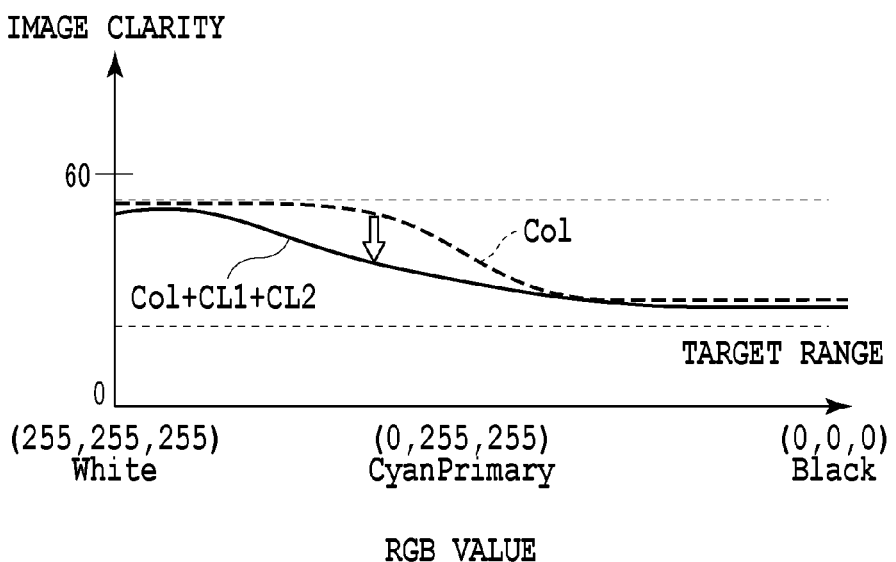

FIGS. 20A and 20B are drawings for explaining the glossiness and image clarity in the case when the signal value conversion and printing operation of this embodiment are performed. In both figures, the horizontal axis indicates the signal values for the same cyan line as in FIG. 19. Moreover, the dashed line indicates the glossiness and image clarity in the case when image enhancing liquid is not used, and the solid line indicates the glossiness and image clarity when image enhancing liquid is printed by the method described above.

In the case where only colored ink is used, in the highlight section from white, the image clarity is within the target range, however the glossiness is below the target range. This is because the printed dots are scattered, and the glossiness of the printed surface depends on the glossiness of the print medium itself. On the other hand, in the case of printing image enhancing liquid by the method of this embodiment, image enhancing liquid is printed in straggling on the blank areas, so the glossiness of the target range increases. Moreover, the image clarity is also kept within the target range.

In the intermediate-density areas, when only colored ink is printed, the image clarity is within the target range, however, the glossiness greatly exceeds the target range. This is because the surface of the print medium is filled in by the spreading of colored ink, and the ink itself has a high glossiness. On the other hand, in the case where image enhancing liquid is used according to the method of this embodiment, suitable unevenness is formed, so the glossiness is kept within the target range. Moreover, even though the value of the image clarity drops, the image clarity is kept within the target range.

In high-density areas, when only colored ink is used, the image clarity is within the target range, however is rather low when compared to the highlight area or intermediate-density areas. This is because there is a large amount of solid component such as the coloring material of the pigmented ink and dispersion resin, so much unevenness is formed on the entire surface. The glossiness exceeds the target value. On the other hand, in this embodiment, image enhancing liquid is used to overcoat the pigmented ink layer. Therefore, the image clarity is not further reduced by unnecessary unevenness, and it is possible to reduce the glossiness to the target range.

In this embodiment, for CL1 that is printed in the same printing scan as colored ink, there is only a small amount of gloss unevenness that occurs due to printing position displacement, so as in the case of colored ink, the noise matrix having a small amplitude that is illustrated in FIG. 12B is used. As a result, first dot arrangement data for the image enhancing liquid is generated. The mask processing unit 907 then performs mask processing according to the mask pattern illustrated in FIG. 8A. On the other hand, for CL2 that is printed after colored ink, there is a large amount of gloss unevenness that occurs due to a printing position displacement, so the noise matrix having a large amplitude that is illustrated in FIG. 12C is used. As a result, second dot arrangement data for the image enhancing liquid is generated. The mask processing unit 907 then performs mask processing according to the mask pattern illustrated in FIG. 8B.

With the embodiment explained above, while properly adjusting the timing and the amount of image enhancing liquid to be printed, image enhancing liquid that overcoats colored ink is used for dot arrangements having a relatively low dispersibility. As a result, it is possible to obtain a uniform image with no gloss unevenness regardless of the gradation and hue, even when printing position displacement occurs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-106988, filed May 8, 2012, which is hereby incorporated by reference herein in its entirety.

What is claimed is:

1. An inkjet printing apparatus that prints an image on a print medium by using a printing head that discharges colored ink and clear liquid, comprising:
    a dot arrangement data generation unit configured to perform error diffusion processing using threshold values that are added noise value to generate dot arrangement data that sets for each area corresponding to each pixel on a print medium whether to print or not print dot of the colored ink and the clear liquid, based on image data indicating gradation of the image; and
    a printing unit configured to use the printing head and perform printing of dots of the colored ink and the clear liquid according to the dot arrangement data;
    wherein the dot arrangement data generation unit makes the noise amplitude that is used when generating the dot arrangement data for the clear liquid greater than the noise amplitude that is used when generating the dot arrangement data for the colored ink.

2. The inkjet printing apparatus according to claim 1, wherein
    the printing unit, according to the dot arrangement data, prints the clear liquid after printing of the colored ink has been completed.

3. The inkjet printing apparatus according to claim 1, wherein
    the dot arrangement data generation unit executes the error diffusion processing by referencing noise matrices in which the noise value is set for each individual pixel, where the noise matrix that is used when generating dot arrangement data for the clear liquid is smaller than the noise matrix that is used when generating dot arrangement data for the colored ink.

4. The inkjet printing apparatus according to claim 1, wherein
    the dot arrangement data generation unit generates the dot arrangement data such that a low-frequency components in the spatial frequency that is 10 cycles/mm or less included in the dot arrangement of the colored ink is smaller than a low-frequency components in the spatial frequency that is 10 cycles/mm or less included in the dot arrangement of the clear liquid.

5. The inkjet printing apparatus according to claim 1, further comprising:
    a setting unit that is configured to be able to set either a first printing mode or a second printing mode; wherein
    when the first printing mode is set,
    the dot arrangement data generation unit makes the noise amplitude that is used when generating the dot arrangement data for the clear liquid greater than the noise amplitude that is used when generating the dot arrangement data for the colored ink to generate the dot arrangement data, and the printing unit, according to the dot arrangement data, performs printing of the clear liquid on an image area to which printing of the colored ink has been completed; and when the second printing mode is set, the dot arrangement data generation unit makes the noise amplitude that is used when generating the dot arrangement data for the clear liquid and the noise amplitude that is used when generating the dot arrangement data for the colored ink equivalent to generate the dot arrangement data, and the printing unit, according to the dot arrangement data, prints the colored ink and the clear liquid at the same time.

6. The inkjet printing apparatus according to claim 1, wherein the dot arrangement data generation unit, based on the image data, generates dot arrangement data for colored ink, first dot arrangement data for the clear liquid for printing at the same time as the colored ink, and second dot arrangement data for the clear liquid for printing after printing of the colored ink has been completed; and the noise amplitude that is used when generating the second dot arrangement data is greater than the noise amplitude that is used when generating the dot arrangement data for colored ink and the first dot arrangement data.

7. The inkjet printing apparatus according to claim 1, further comprising:

a setting unit that is configured to be able to set either a first printing mode or a second printing mode; wherein the printing unit performs printing for an image area on the print medium by a plurality of printing scans of the printing head while ejecting the colored ink and the clear liquid according to the dot arrangement data, when the first printing mode is set, the dot arrangement data generation unit makes a noise amplitude that is used when generating the dot arrangement data for the clear liquid, that is printed onto the image area by printing scans performed after printing scans for the colored ink onto the image area has been completed, is greater than a noise amplitude that is used when generating the dot arrangement data for the colored ink that is printed onto the image area to generate the dot arrangement data; and when the second printing mode is set, the dot arrangement data generation unit makes a noise amplitude that is used when generating the dot arrangement data for the clear liquid and a noise amplitude that is used when generating the dot arrangement data for the colored ink equivalent to generate the dot arrangement data so that the printing unit does not perform printing scan for the clear liquid onto the image area after printing scans for the colored ink onto the image area has been completed.

8. An inkjet printing method for printing an image on a print medium by using a printing head that discharges colored ink and clear liquid, comprising:

a dot arrangement data generation step that performs error diffusion processing using threshold values that are added noise value and generates dot arrangement data that sets for each area corresponding to each pixel on a print medium whether to print or not print dot of the colored ink and the clear liquid, based on image data indicating gradation of the image; and a printing step that uses the printing head and performs printing of dots of the colored ink and the clear liquid according to the dot arrangement data;

wherein the dot arrangement data generation step makes the noise amplitude that is used when generating the dot arrangement data for the clear liquid greater than the noise amplitude that is used when generating the dot arrangement data for the colored ink.

9. An image processing apparatus for printing an image on a print medium by applying colored ink and image enhancing liquid, the image processing apparatus comprising:

an obtaining unit configured to obtain image data indicating gradation of the image; and a dot arrangement data generation unit configured to perform error diffusion processing using threshold values that are added noise value to generate dot arrangement data that sets for predetermined area on the print medium whether to print or not print dot of the colored ink and the image enhancing liquid, based on image data obtained by the obtaining unit;

wherein the dot arrangement data generation unit makes the noise amplitude that is used when generating the dot arrangement data for the image enhancing liquid greater than the noise amplitude that is used when generating the dot arrangement data for the colored ink.

10. The image processing apparatus according to claim 9, wherein the dot arrangement data generation unit executes the error diffusion processing by referencing noise matrices in which the noise value is set for each individual pixel, where the noise matrix that is used when generating dot arrangement data for the image enhancing liquid is smaller than the noise matrix that is used when generating dot arrangement data for the colored ink.

11. The image processing apparatus according to claim 9, wherein the dot arrangement data generation unit generates the dot arrangement data such that a low-frequency components in the spatial frequency that is 10 cycles/mm or less included in the dot arrangement of the colored ink is smaller than a low-frequency components in the spatial frequency that is 10 cycles/mm or less included in the dot arrangement of the image enhancing liquid.

12. The image processing apparatus according to claim 9, further comprising:

a setting unit that is configured to be able to set either a first printing mode or a second printing mode; wherein when the first printing mode is set, the dot arrangement data generation unit makes the noise amplitude that is used when generating the dot arrangement data for the image enhancing liquid greater than the noise amplitude that is used when generating the dot arrangement data for the colored ink to generate the dot arrangement data; and when the second printing mode is set, the dot arrangement data generation unit makes the noise amplitude that is used when generating the dot arrangement data for the image enhancing liquid and the noise amplitude that is used when generating the dot arrangement data for the colored ink equivalent to generate the dot arrangement data.

13. The image processing apparatus according to claim 9, wherein the dot arrangement data generation unit, based on the image data, generates dot arrangement data for colored ink, first dot arrangement data for the image enhancing liquid for printing at the same time as the colored ink, and second dot arrangement data for the image enhancing liquid for printing after printing of the colored ink has been completed; and the noise amplitude that is used when generating the second dot arrangement data is greater than the noise amplitude that is used when generating the dot arrangement data for colored ink and the first dot arrangement data.

14. The image processing apparatus according to claim 9, further comprising:
   a printing unit configured to use the printing head and perform printing of dots of the colored ink and the image enhancing liquid according to the dot arrangement data; and
   a setting unit that is configured to be able to set either a first printing mode or a second printing mode; wherein
   the printing unit performs printing on an image area of the print medium by a plurality of printing scans of the printing head while ejecting the colored ink and the image enhancing liquid according to the dot arrangement data,
   when the first printing mode is set,
   the dot arrangement data generation unit makes a noise amplitude that is used when generating the dot arrangement data for the image enhancing liquid, that is printed onto the image area by printing scans performed after printing scans for the colored ink onto the image area has been completed, greater than a noise amplitude that is used when generating the dot arrangement data for the colored ink that is printed onto the image area to generate the dot arrangement data; and
   when the second printing mode is set,
   the dot arrangement data generation unit makes a noise amplitude that is used when generating the dot arrangement data for the image enhancing liquid and a noise amplitude that is used when generating the dot arrangement data for the colored ink equivalent to generate the dot arrangement data so that the printing unit does not perform printing scan for the image enhancing liquid onto the image area after printing scans for the colored ink onto the image area has been completed.

* * * * *